(12) United States Patent
Bouisse

(10) Patent No.: US 12,706,247 B2
(45) Date of Patent: Aug. 11, 2026

(54) COMPONENT CONFIGURED WITH INTRINSIC SHIELDING AND PROCESS OF IMPLEMENTING THE SAME

(71) Applicant: MACOM Technology Solutions Holdings, Inc., Lowell, MA (US)

(72) Inventor: Gérard Bouisse, Saint-Lys (FR)

(73) Assignee: Macom Technology Solutions Holdings, Inc., Lowell, MA (US)

( * ) Notice: Subject to any disclaimer, the term of this patent is extended or adjusted under 35 U.S.C. 154(b) by 343 days.

(21) Appl. No.: 18/317,541

(22) Filed: May 15, 2023

(65) Prior Publication Data

US 2024/0387107 A1 Nov. 21, 2024

(51) Int. Cl.
*H01G 4/012* (2006.01)
*H01G 4/232* (2006.01)

(52) U.S. Cl.
CPC ............. *H01G 4/012* (2013.01); *H01G 4/232* (2013.01)

(58) Field of Classification Search
CPC ........... H01G 4/012; H01G 4/232; H01G 4/30
See application file for complete search history.

(56) References Cited

U.S. PATENT DOCUMENTS

2013/0241361 A1* 9/2013 Lee ........................ H01G 4/012 336/200
2014/0240895 A1* 8/2014 Lee ........................ H01G 4/12 29/25.42
2016/0005543 A1* 1/2016 Wada .................. H01G 4/1227 361/301.4
2016/0099107 A1* 4/2016 Lee ........................ H01G 4/30 361/301.4
2017/0213647 A1* 7/2017 Ahn ....................... H01G 4/012
2019/0279819 A1* 9/2019 Horn ....................... H01G 4/12
2020/0118760 A1* 4/2020 Jun ........................ H01G 4/005
2021/0319951 A1* 10/2021 Demcko ................. H01G 2/08
2022/0181087 A1* 6/2022 Park ....................... H01G 4/005

* cited by examiner

*Primary Examiner* — Michael P Mcfadden
(74) *Attorney, Agent, or Firm* — BakerHostetler

(57) ABSTRACT

A shielded capacitor includes a first terminal; one or more first capacitor metals electrically connected to the first terminal; a second terminal; one or more second capacitor metals electrically connected to the second terminal. The shielded capacitor further includes a shielding structure. The shielding structure being configured to limit a variation of an RF characteristic due to a presence of a metallic structure.

27 Claims, 24 Drawing Sheets

200
250
222
100
102
190
101
X
Z
221

COMPONENT CONFIGURED WITH INTRINSIC SHIELDING AND PROCESS OF IMPLEMENTING THE SAME

FIELD OF THE DISCLOSURE

The disclosure relates to a multilayer capacitor configured with intrinsic shielding. The disclosure further relates to a device implementing a multilayer capacitor configured with intrinsic shielding. The disclosure further relates to a process of implementing a multilayer capacitor configured with intrinsic shielding. The disclosure further relates to a process of implementing a device with a multilayer capacitor configured with intrinsic shielding. The disclosure further relates to a component configured with intrinsic shielding. The disclosure further relates to a device implementing a component configured with intrinsic shielding. The disclosure further relates to a process of implementing a component configured with intrinsic shielding. The disclosure further relates to a process of implementing a device with a component configured with intrinsic shielding.

BACKGROUND OF THE DISCLOSURE

Various devices, such as radio frequency (RF) devices, RF power devices, RF power amplifiers, and/or the like typically implement one or more components, such as capacitors. Moreover, these various devices often utilize one or more metallic structures, such as a cooling device, a topside cooling device, a heat sink, a topside heat sink, and/or the like, for reducing an operating temperature of the various devices.

However, the presence of the one or more metallic structures in close proximity to the one or more components, such as capacitors, in the various devices may impact RF performance and/or an RF characteristic such as generating a detuning problem. For example, a detuning problem, a detuning issue, a performance issue, a performance problem, and/or the like that may be a change in RF characteristics of the various devices. Further, in implementations of various devices implementing a flip chip configuration, the one or more metallic structures may be arranged in closer proximity to the one or more components, such as capacitors, in the various devices that may further exacerbate the impact on RF performance and/or an RF characteristic.

Accordingly, what is needed is a device and process to address the detuning problem as it relates to implementation of one or more components, such as capacitors, with one or more metallic structures.

SUMMARY OF THE DISCLOSURE

The foregoing needs are met, to a great extent, by the disclosure, wherein in one aspect a component, such as multilayer capacitor, configured with intrinsic shielding and process of implementing the same are provided.

In one aspect, a shielded capacitor includes a first terminal. The shielded capacitor in addition includes one or more first capacitor metals electrically connected to the first terminal. The shielded capacitor moreover includes a second terminal. The shielded capacitor also includes one or more second capacitor metals electrically connected to the second terminal. The shielded capacitor further includes a shielding structure. The shielding structure being configured to limit a variation of an RF characteristic due to a presence of a metallic structure.

In one aspect, a process includes providing a first terminal. The process in addition includes electrically connecting one or more first capacitor metals to the first terminal. The process moreover includes providing a second terminal. The process also includes electrically connecting one or more second capacitor metals to the second terminal. The process further includes providing a shielding structure. The process in addition includes configuring the shielding structure to limit a variation of an RF characteristic due to a presence of a metallic structure.

In one aspect, a shielded component includes a first terminal. The shielded component in addition includes one or more passive devices electrically connected to the first terminal. The component moreover includes a second terminal. The component also includes the one or more passive devices further electrically connected to the second terminal. The component further includes a shielding structure. The component in addition includes the shielding structure being configured to limit a variation of an RF characteristic due to a presence of a metallic structure.

In one aspect, a process includes providing a first terminal. The process in addition includes electrically connecting one or more passive devices to the first terminal. The process moreover includes providing a second terminal. The process also includes electrically connecting the one or more passive devices to the second terminal. The process further includes providing a shielding structure. The process in addition includes configuring the shielding structure to limit a variation of an RF characteristic due to a presence of a metallic structure.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
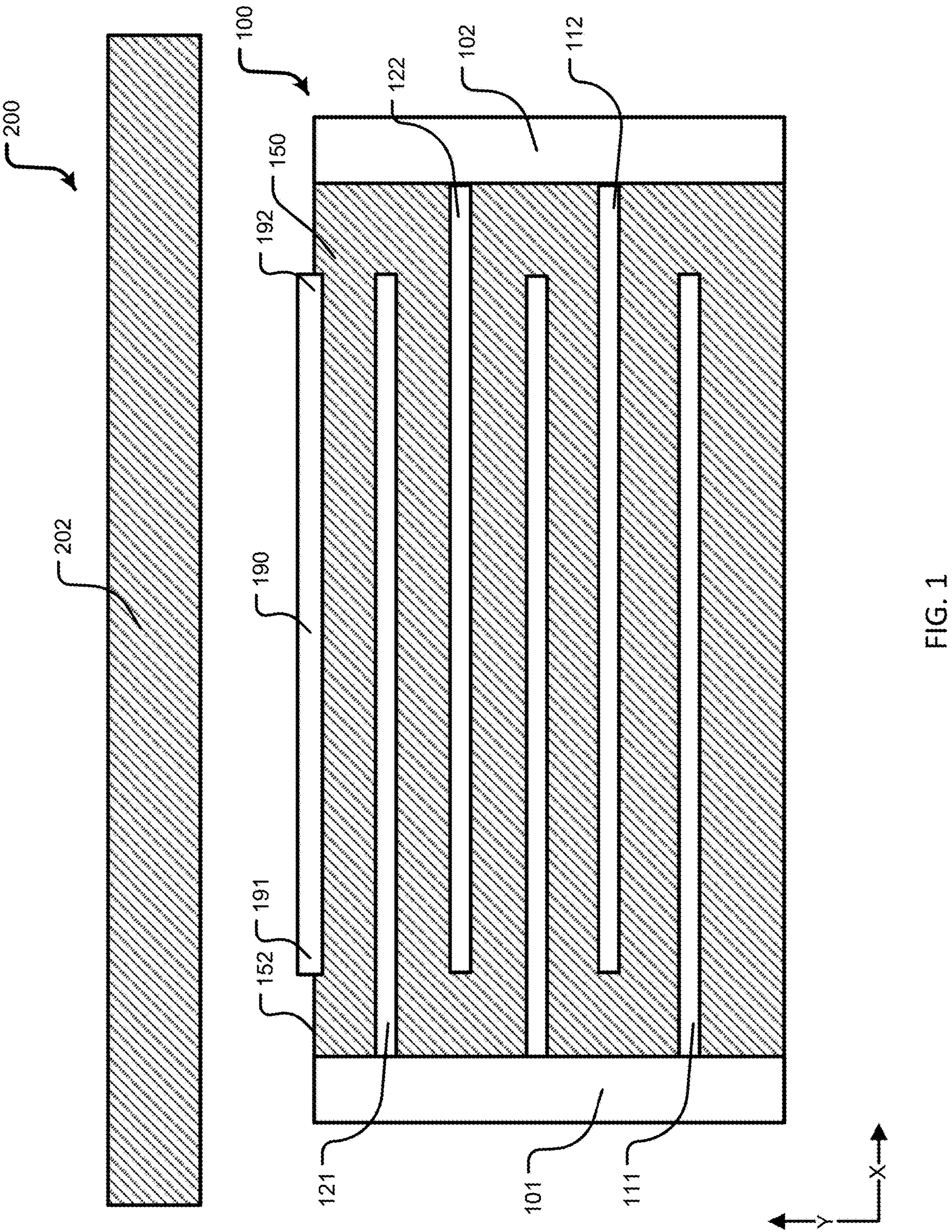
FIG. 1 illustrates a cross-sectional view of a shielded capacitor according to aspects of the disclosure.

The disclosure will now be described with reference to the drawing figures, in which like reference numerals refer to like parts throughout. Aspects of the disclosure advantageously provide a multilayer capacitor configured with intrinsic shielding and process of implementing the same.

Aspects of the disclosure may address, solve, alleviate, reduce, and/or the like a detuning problem, such as a change in RF characteristics of an RF device. In particular, a change in RF characteristics as it relates to one or more components, such as capacitors, in closer proximity to one or more metallic structures. In aspects, the one or more components, such as capacitors, may be multilayer capacitors, ceramic capacitors, multilayer ceramic capacitors, and/or the like. In aspects, the one or more capacitors may be configured with a shield, an intrinsic shield, a shield intrinsic to the one or more capacitors, and/or the like.

Aspects of the disclosure may include a device and/or process configured to be unsensitive to implementation of the one or more metallic structures in conjunction with the one or more capacitors. In aspects, the disclosed device and process provides a number of implementations to address, solve, alleviate, reduce, and/or the like the detuning problem. In aspects, addressing the detuning problem may result in more predictable components, more predictable operation of components, more predictable devices, more predictable operation of devices, and/or the like.

In aspects, addressing the detuning problem may result in more predictable components, more predictable operation of components, more predictable devices, more predictable operation of devices, and/or the like with implementations of flip chip configurations having top side cooling devices. Aspects of the disclosure may be implemented in RF devices, RF power devices, RF power amplifiers, low noise amplifiers, power amplifiers, filters, mixers, and/or the like.

FIG. 1 illustrates a cross-sectional view of a shielded capacitor according to aspects of the disclosure.

Figure 2:
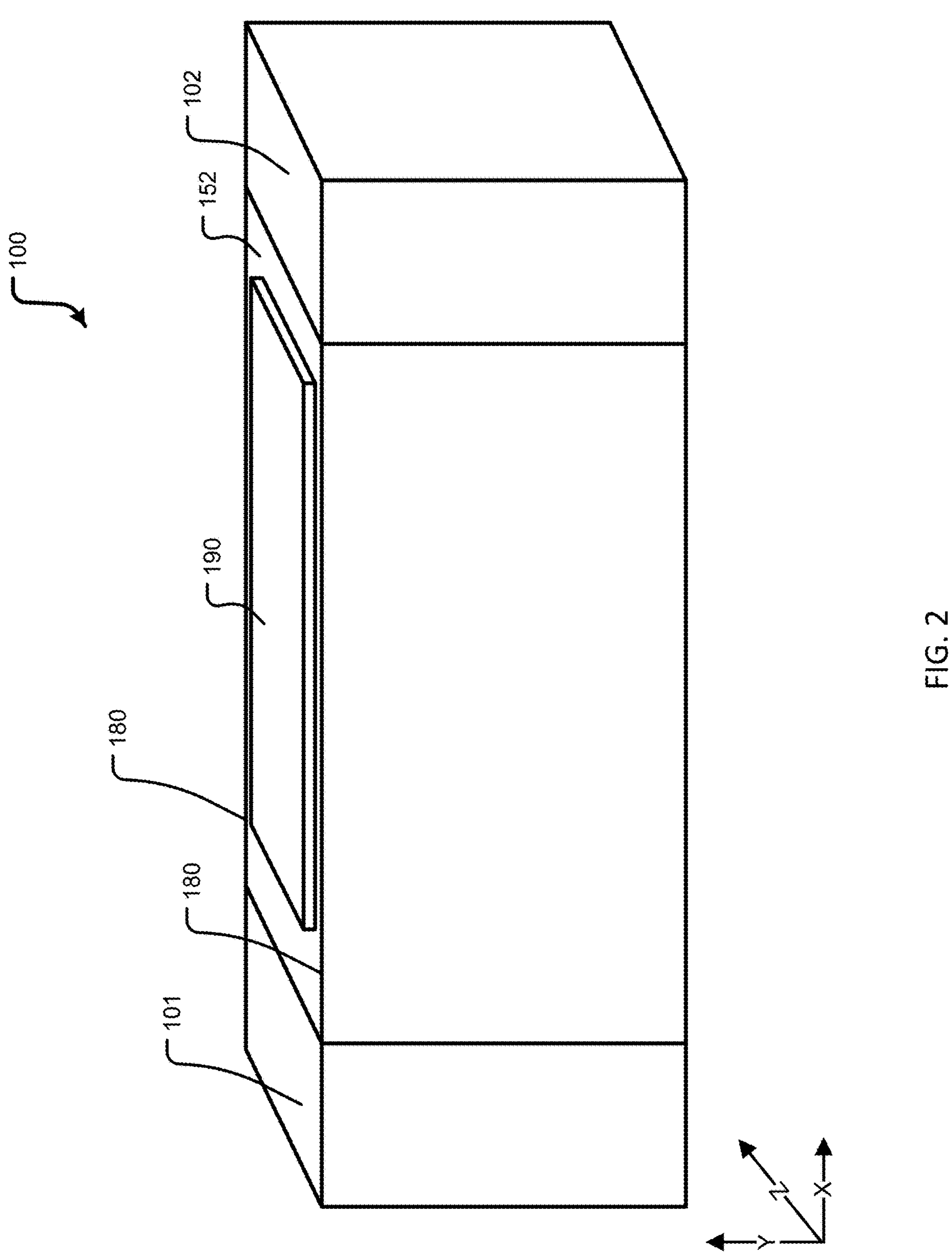
FIG. 2 illustrates a perspective view of the shielded capacitor according to FIG. 1.

FIG. 2 illustrates a perspective view of the shielded capacitor according to FIG. 1.

In particular, FIG. 1 illustrates a cross-sectional view of a shielded capacitor 100 according to aspects of the disclosure. In particular, the shielded capacitor 100 may include a first terminal 101 and a second terminal 102. Further, the shielded capacitor 100 may include a shielding structure 190.

The shielded capacitor 100 may be implemented in a device 200 that includes a metallic structure 202. In aspects, the device 200 may be an RF device, an RF power device, an RF power amplifier, a flip chip RF device, a flip chip RF power device, a flip chip RF power amplifier, a flip chip power amplifier, a low noise amplifier, a filter, a mixer, and/or the like. In aspects, the device 200 may be implemented with a package and/or as a packaged implementation of an RF device, an RF power device, an RF power amplifier, a flip chip RF device, a flip chip RF power device, a flip chip RF power amplifier, a flip chip power amplifier, a low noise amplifier, a filter, a mixer, and/or the like.

In aspects, the metallic structure 202 may be a cooling device, a topside cooling device, a heat sink, a topside heat sink, a support, a surface, a package support, a package surface, a package support surface, a flange, a metal flange, a leadframe, a metal leadframe and/or the like. In aspects, the metallic structure 202 may be implemented as a coin, a copper coin, and/or the like. In aspects, the metallic structure 202 may be arranged vertically above the shielded capacitor 100. In this regard, an existence of the metallic structure 202 in proximity to an unshielded capacitor may impact performance of the device 200. On the other hand, without an implementation of the metallic structure 202 in proximity to the unshielded capacitor a performance of the device 200 may accordingly be different. In aspects, proximity of the metallic structure 202 may be defined as 0 μm-900 μm, 0 μm-700 μm, 0 μm-500 μm, and/or 0 μm-300 μm.

As described herein, an existence of the metallic structure 202 in proximity to the shielded capacitor 100 may not impact performance of the device 200. On the other hand, without an implementation of the metallic structure 202 in proximity to the shielded capacitor 100, a performance of the device 200 may accordingly not be different. However, the shielded capacitor 100 may optionally be implemented in the device 200 when the metallic structure 202 is not in proximity to the shielded capacitor 100. In aspects, the metallic structure 202 may have a floating configuration, an electrically isolated configuration, a grounded configuration, and/or the like.

In aspects, the shielded capacitor 100 may be a multilayer capacitor, a ceramic capacitor, a multilayer ceramic capacitor, and/or the like. In aspects, the shielded capacitor 100 may be configured as a surface mount device (SMD) and/or the like.

In aspects, the shielded capacitor 100 implementing the shielding structure 190 may address, solve, alleviate, reduce, and/or the like a variation of a performance, a variation of an RF performance, and/or the like of the device 200 with the presence of the metallic structure 202, due to a change in mutual coupling. In this regard, the shielding structure 190 may be configured to change a mutual coupling between the shielding structure 190 and/or the shielded capacitor 100 and the metallic structure 202.

In aspects, the shielded capacitor 100 implementing the shielding structure 190 may address, solve, alleviate, reduce, and/or the like a variation of the variation of a performance, an RF performance, and/or the like of the device 200 based on a distance between the shielded capacitor 100 and the metallic structure 202. In other words, a distance between the shielded capacitor 100 and the metallic structure 202 may vary and an associated performance of the device 200 may not vary, may have limited variation, and/or the like due to the implementation of the shielding structure 190 by the shielded capacitor 100.

In aspects, the shielded capacitor 100 implementing the shielding structure 190 may address, solve, alleviate, reduce, and/or the like the detuning problem, such as a change in RF characteristics of the device 200.

In aspects, the shielded capacitor 100 may implement the shielding structure 190 as an embedded metallic structure within the shielded capacitor 100 that may shield the shielded capacitor 100 from the environment that may include the metallic structure 202. In this regard, the shielding structure 190 may be configured such that an effective distance from the shielded capacitor 100 to the metallic structure 202 may be effectively frozen. In other words, the effective distance from the shielded capacitor 100 to the metallic structure 202 may be a non-variable, may have limited impact on performance of the shielded capacitor 100, may have a reduced impact on performance of the shielded capacitor 100, and/or the like.

In other words, the shielding structure 190 may generate an RF variation like a regular capacitor, such as a regular SMD capacitor. However, the implementation of the shielding structure 190 in the shielded capacitor 100 may effectively freeze and/or limit any further RF variation of the device 200. In this regard, the effective distance between the shielded capacitor 100 and the metallic structure 202 may be effectively frozen because the shielding structure 190 will act as a shield for influences from the metallic structure 202. Accordingly, an exact positioning of the metallic structure 202 with respect to the shielded capacitor 100 may be less critical and accordingly manufacturing of the device 200 may be less costly.

In aspects, the shielding structure 190 may be a metal layer, a sputtered metal layer, a plurality of metal layers, a plurality of sputtered metal layers, and/or the like. In aspects, the shielding structure 190 may be include various metal materials including one or more of aluminum, copper, silver, gold, and/or the like. In one aspect, the shielding structure 190 may be a sputtered metal layer.

With reference to FIG. 1, the shielding structure 190 may be arranged within an upper surface 152 of the shielded capacitor 100. In this regard, the shielding structure 190 may include a portion vertically above the upper surface 152 along the y-axis and a portion vertically below the upper surface 152 along the y-axis. Further, a dielectric material 150 may be located below the shielding structure 190. In aspects, the dielectric material 150 may be a ceramic material. In aspects, the upper surface 152 of the shielded capacitor 100 may be a surface adjacent the metallic structure 202. In aspects, the upper surface 152 of the shielded capacitor 100 may be a surface opposite a bottom of the shielded capacitor 100.

In other aspects not illustrated, the shielding structure 190 may be arranged vertically below the upper surface 152 of the shielded capacitor 100 and may include portions of the dielectric material 150 surrounding some surfaces of the shielding structure 190 and/or all surfaces of the shielding structure 190. Further, the dielectric material 150 may be located below the shielding structure 190.

In other aspects not illustrated, the shielding structure 190 may be arranged on the upper surface 152 of the shielded capacitor 100. Further, the dielectric material 150 may be located only below the shielding structure 190.

Additionally, with reference to FIG. 1, the shielding structure 190 may include a first end 191 and a second end 192. In this regard, the shielding structure 190 may be implemented as a floating shielding structure.

In this regard, the shielding structure 190 may be electrically isolated from the first terminal 101 and/or the second terminal 102. In particular, the first end 191 may be electrically isolated from the first terminal 101 and the second terminal 102; and the second end 192 may be electrically isolated from the first terminal 101 and the second terminal 102. More specifically, the first end 191 of the shielding structure 190 may be located within the dielectric material 150; and the second end 192 of the shielding structure 190 may be located within the dielectric material 150.

Further, the shielded capacitor 100 may include one or more first capacitor metals. The one or more first capacitor metals may be connected to the first terminal 101.

In aspects, the one or more first capacitor metals may include a first lower capacitor metal 111, a first upper capacitor metal 121, with the dielectric material 150 arranged therebetween. The first terminal 101 may be electrically connected to the first lower capacitor metal 111 and the first upper capacitor metal 121. There may be additional implementations of first capacitor metals connected to the first terminal 101 below, above, and/or between the first lower capacitor metal 111 and/or the first upper capacitor metal 121. A connection between the first terminal 101 and the first lower capacitor metal 111 and/or the first upper capacitor metal 121 may optionally include an adhesive, soldering, sintering, eutectic bonding, thermal compression bonding, ultrasonic bonding/welding, a clip component, and/or the like as described herein.

The first lower capacitor metal 111 and the first upper capacitor metal 121 may extend within the shielded capacitor 100 and/or the dielectric material 150 along an x-axis or longitudinal axis toward the second terminal 102. Further, an end of the first lower capacitor metal 111 and/or the first upper capacitor metal 121 may terminate within the dielectric material 150 on a distal end thereof as each approaches the second terminal 102.

Additionally, the shielded capacitor 100 may include one or more second capacitor metals. The one or more second capacitor metals may be connected to the second terminal 102.

In aspects, the one or more second capacitor metals may include a second lower capacitor metal 112, a second upper capacitor metal 122, with the dielectric material 150 arranged therebetween. The second terminal 102 may be electrically connected to the second lower capacitor metal 112 and the second upper capacitor metal 122. There may be additional second capacitor metals connected to the second terminal 102 below, above, and/or between the second lower capacitor metal 112 and the second upper capacitor metal 122. A connection between the second terminal 102 and the second lower capacitor metal 112 and/or the second upper capacitor metal 122 may optionally include an adhesive, soldering, sintering, eutectic bonding, thermal compression bonding, ultrasonic bonding/welding, a clip component, and/or the like as described herein.

The second lower capacitor metal 112 and the second upper capacitor metal 122 may extend within the shielded capacitor 100 and/or the dielectric material 150 along an x-axis or longitudinal axis toward the first terminal 101. Further, an end of the second lower capacitor metal 112 and/or the second upper capacitor metal 122 may terminate within the dielectric material 150 on a distal end thereof as each approaches the first terminal 101.

With reference to FIG. 2, the shielding structure 190 may extend laterally along the z-axis between side edges 180 of the shielded capacitor 100. In aspects, the shielding structure 190 may partially extend laterally along the z-axis between the side edges 180 of the shielded capacitor 100. In aspects, the shielding structure 190 may extend laterally along the z-axis a distance of 20%-99%, 20%-50%, 50%-80%, 80%-90%, and/or 90%-99% of a distance between the side edges 180 of the shielded capacitor 100. In aspects not illustrated, the shielding structure 190 may fully extend laterally along the z-axis to and between the side edges 180 of the shielded capacitor 100.

Further, it should be noted that the aspects of FIG. 1 and FIG. 2 may optionally include any other aspects of the shielded capacitor 100, the shielding structure 190, the device 200, the process of configuring a capacitor with shielding 300 (illustrated in FIG. 17), the process of configuring a device with a shielded capacitor 400 (illustrated in FIG. 18), and/or the like as described herein.

Figure 3:
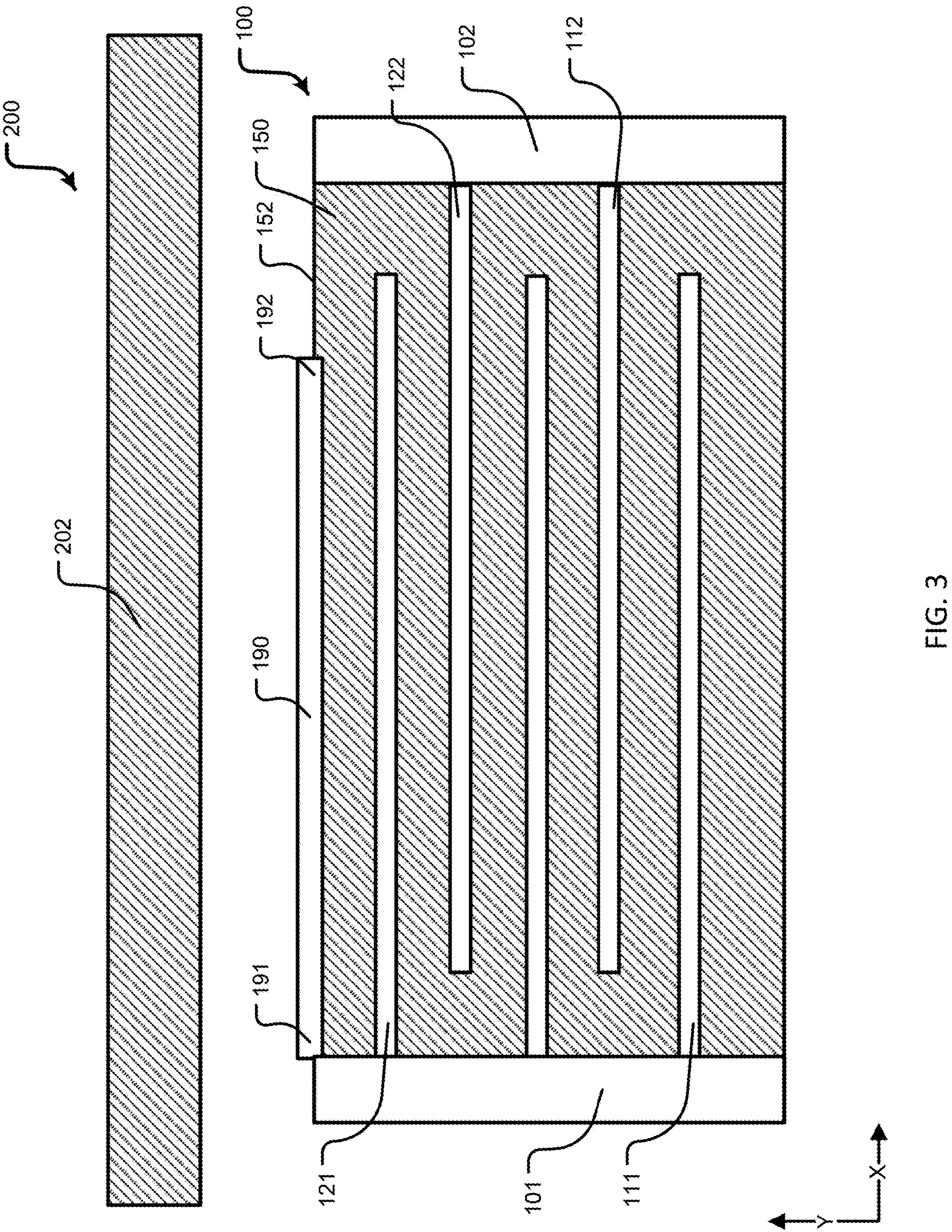
FIG. 3 illustrates a cross-sectional view of a shielded capacitor according to aspects of the disclosure.

FIG. 3 illustrates a cross-sectional view of a shielded capacitor according to aspects of the disclosure.

Figure 4:
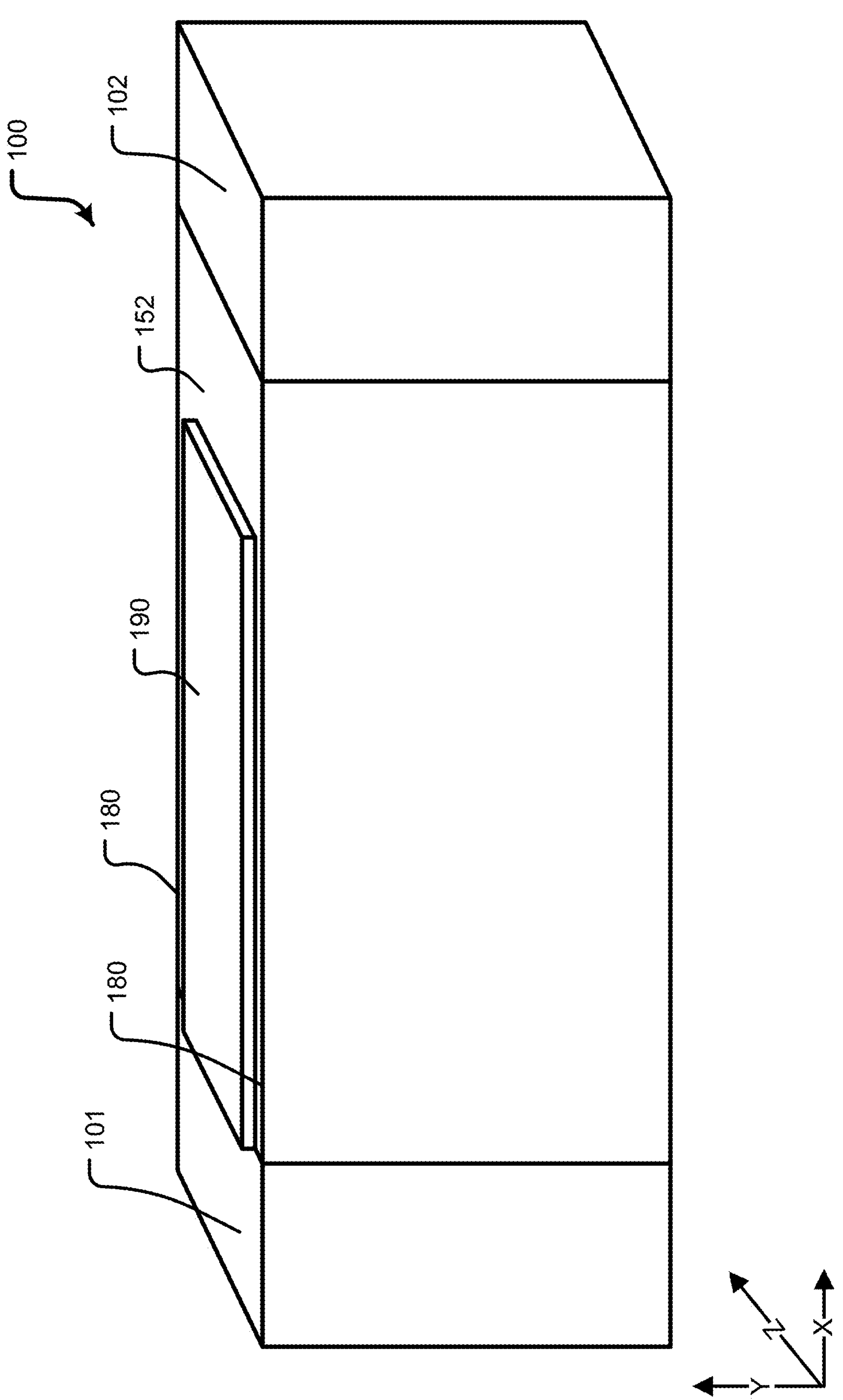
FIG. 4 illustrates a perspective view of the shielded capacitor according to FIG. 3.

FIG. 4 illustrates a perspective view of the shielded capacitor according to FIG. 3.

In particular, the aspects of FIG. 3 and FIG. 4 may optionally include any other aspects of the shielded capacitor 100, the shielding structure 190, the device 200, the process of configuring a capacitor with shielding 300, the process of configuring a device with a shielded capacitor 400, and/or the like as described herein. In particular, FIG. 3 and FIG. 4 illustrate an implementation of the shielded capacitor 100 where the shielding structure 190 is electrically connected to the first terminal 101; and the shielding structure 190 is isolated from the second terminal 102. Alternatively, in aspects not illustrated, the shielding structure 190 may be electrically connected to the second terminal 102 and electrically isolated from the first terminal 101.

In particular aspects, the shielding structure 190 may be electrically connected to the first terminal 101 and electrically isolated from the second terminal 102. More specifically, the second end 192 of the shielding structure 190 may be located within the dielectric material 150. A connection between the shielding structure 190 and the first terminal 101 may optionally include an adhesive, soldering, sintering, eutectic bonding, thermal compression bonding, ultrasonic bonding/welding, a clip component, and/or the like as described herein.

Figure 5:
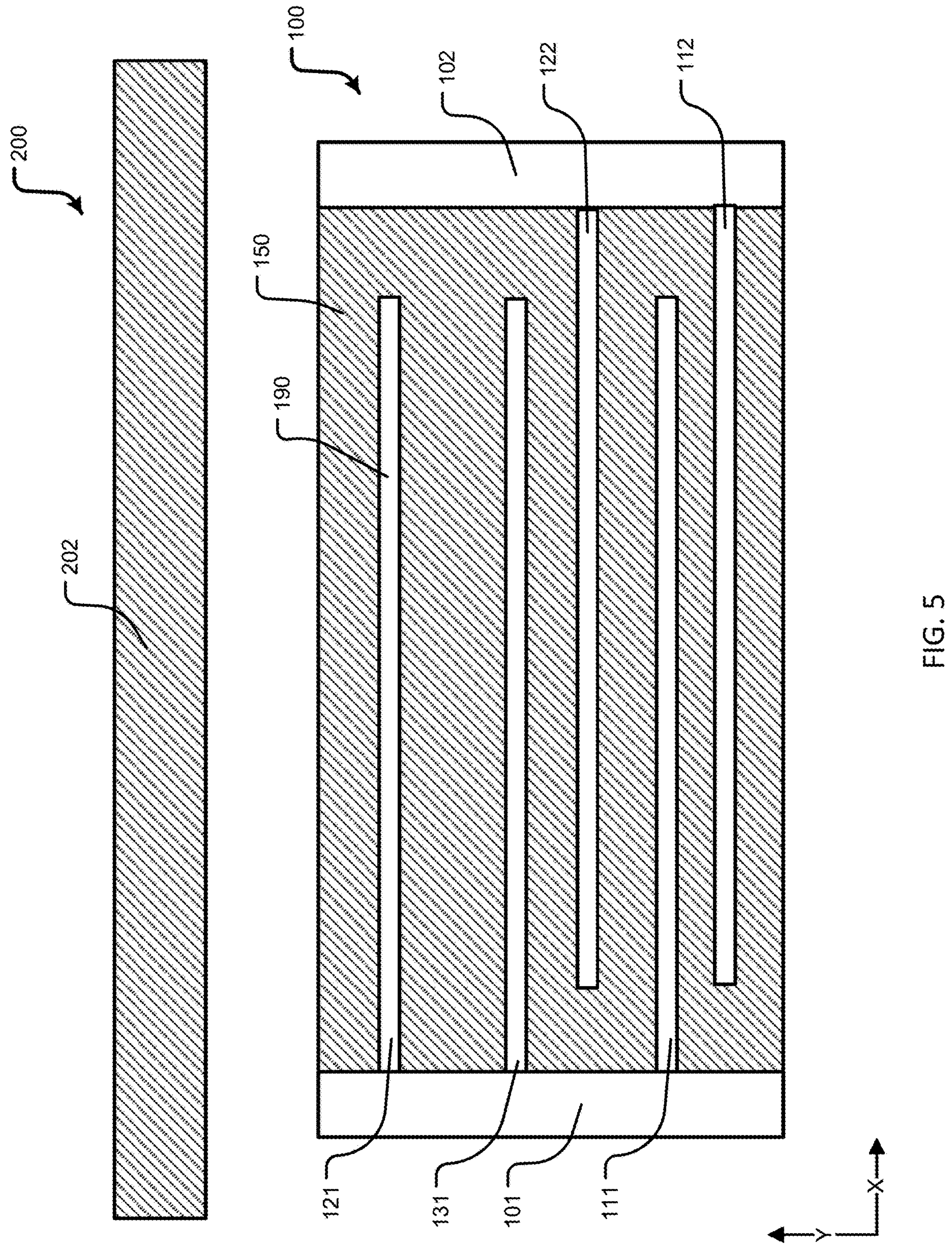
FIG. 5 illustrates a cross-sectional view of a shielded capacitor according to aspects of the disclosure.

FIG. 5 illustrates a cross-sectional view of a shielded capacitor according to aspects of the disclosure.

In particular, the aspects of FIG. 5 may optionally include any other aspects of the shielded capacitor 100, the shielding structure 190, the device 200, the process of configuring a capacitor with shielding 300, the process of configuring a device with a shielded capacitor 400, and/or the like as described herein. In particular, FIG. 5 illustrates an implementation where the first upper capacitor metal 121 of the shielded capacitor 100 may be configured as the shielding structure 190. In this regard, the shielded capacitor 100 may be implemented without the second upper capacitor metal 122 (not illustrated), implemented without the second upper capacitor metal 122 being arranged below the first upper capacitor metal 121, and/or the like. Accordingly, the first upper capacitor metal 121 may act as a shield, the first upper capacitor metal 121 may act as the shielding structure 190, and/or the first upper capacitor metal 121 may be configured as the shielding structure 190.

In particular aspects where the first upper capacitor metal 121 is configured and/or implemented as the shielding structure 190, the first upper capacitor metal 121 may be the vertically uppermost capacitor metal implemented by the shielded capacitor 100. In particular aspects where the first upper capacitor metal 121 is configured and/or implemented as the shielding structure 190, a first capacitor metal 131 may be arranged in the dielectric material 150 of the shielded capacitor 100 as the next metal layer within the shielded capacitor 100 vertically below the first upper capacitor metal 121. In this aspect, only the dielectric material 150 is arranged vertically between the first upper capacitor metal 121 and the first capacitor metal 131. In this aspect, the shielded capacitor 100 may be configured without a second capacitor metals between the first upper capacitor metal 121 and the first capacitor metal 131.

In particular aspects where the first upper capacitor metal 121 is configured and/or implemented as the shielding structure 190, the two vertically uppermost capacitor metals may be connected to the first terminal 101. In this aspect, an uppermost second capacitor metal may be arranged vertically below the first upper capacitor metal 121 and the first capacitor metal 131 of the shielded capacitor 100.

Figure 6:
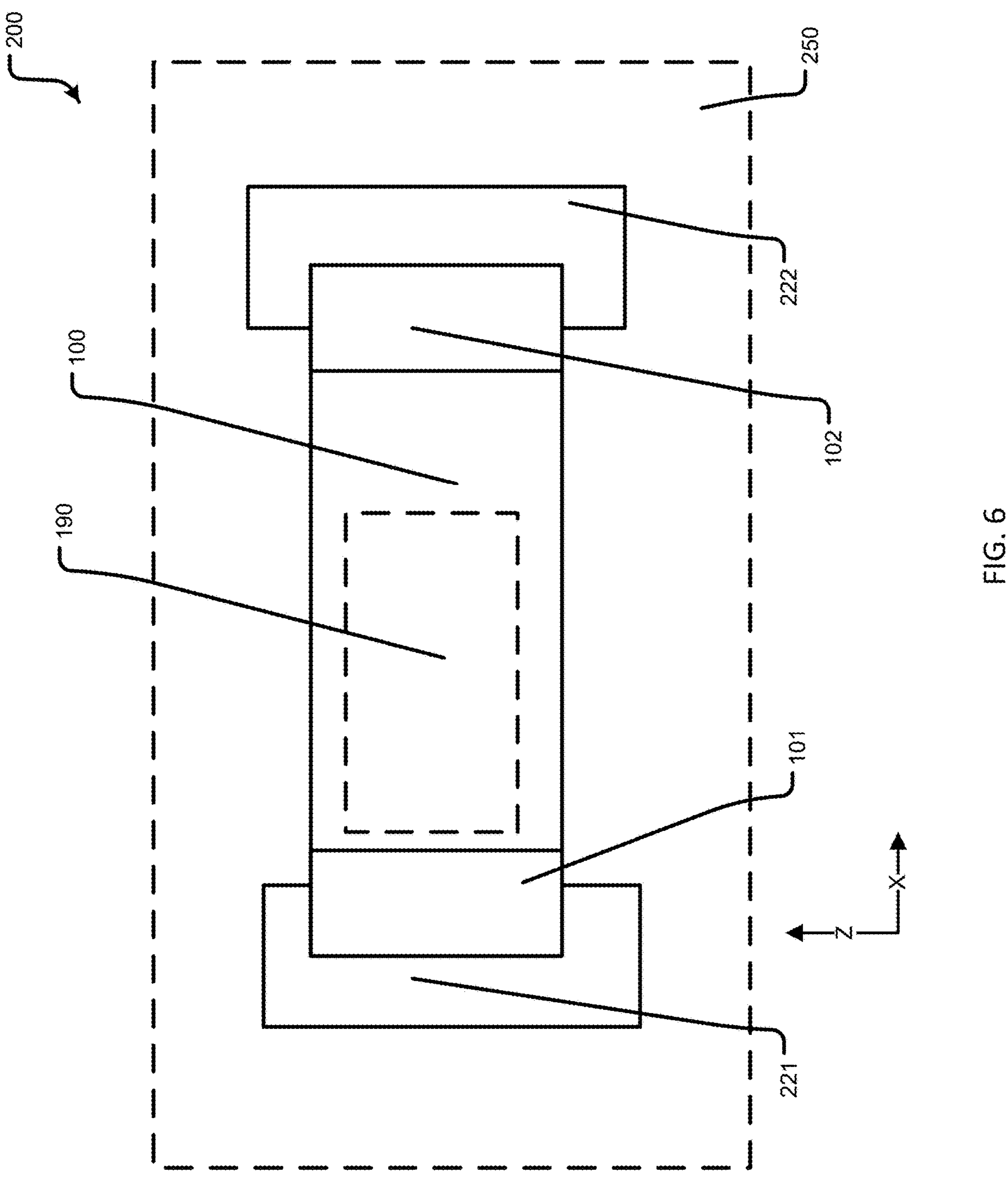
FIG. 6 illustrates a top view of a shielded capacitor according to aspects of the disclosure.

FIG. 6 illustrates a top view of a shielded capacitor according to aspects of the disclosure.

In particular, FIG. 6 illustrates a top view of the shielded capacitor 100 according to aspects of the disclosure. In particular, the aspects of FIG. 6 may optionally include any other aspects of the shielded capacitor 100, the shielding structure 190, the device 200, the process of configuring a capacitor with shielding 300, the process of configuring a device with a shielded capacitor 400, and/or the like as described herein.

More specifically, as illustrated in FIG. 6, the device 200 may include a substrate 250 and the shielded capacitor 100 may be mounted to the substrate 250. In this regard, the shielded capacitor 100 may include any implementation of the shielding structure 190 as described herein. The substrate 250 may be a circuit board, a printed circuit board (PCB), a printed wiring board (PWB), an IPD (integrated passive device) substrate, and/or the like. In aspects, the substrate 250 may include a PCB material, silicon carbide (SiC), silicon, Alumina, Aluminum Nitride (AlN), Beryllium oxide (BeO), Titanium Oxide (TiO), metal-oxide substrates, high dielectric metal-oxide substrates, high dielectric substrates, thermally conductive dielectric materials/substrates, a thermally conductive high dielectric material substrate, and/or other similar thermal conductivity performance dielectric material.

Additionally, the substrate 250 may include a first terminal 221 and a second terminal 222. The first terminal 101 of the shielded capacitor 100 may connect to the first terminal 221 of the substrate 250; and the second terminal 102 of the shielded capacitor 100 may connect to the second terminal 222 of the substrate 250. A connection between the first terminal 221 and the first terminal 101 may optionally include an adhesive, soldering, sintering, eutectic bonding, thermal compression bonding, ultrasonic bonding/welding, a clip component, and/or the like as described herein. A connection between the second terminal 222 and the second terminal 102 may optionally include an adhesive, soldering, sintering, eutectic bonding, thermal compression bonding, ultrasonic bonding/welding, a clip component, and/or the like as described herein. In aspects, the device 200 may implement the shielded capacitor 100 in a series configuration and/or in a shunt configuration.

Figure 7:
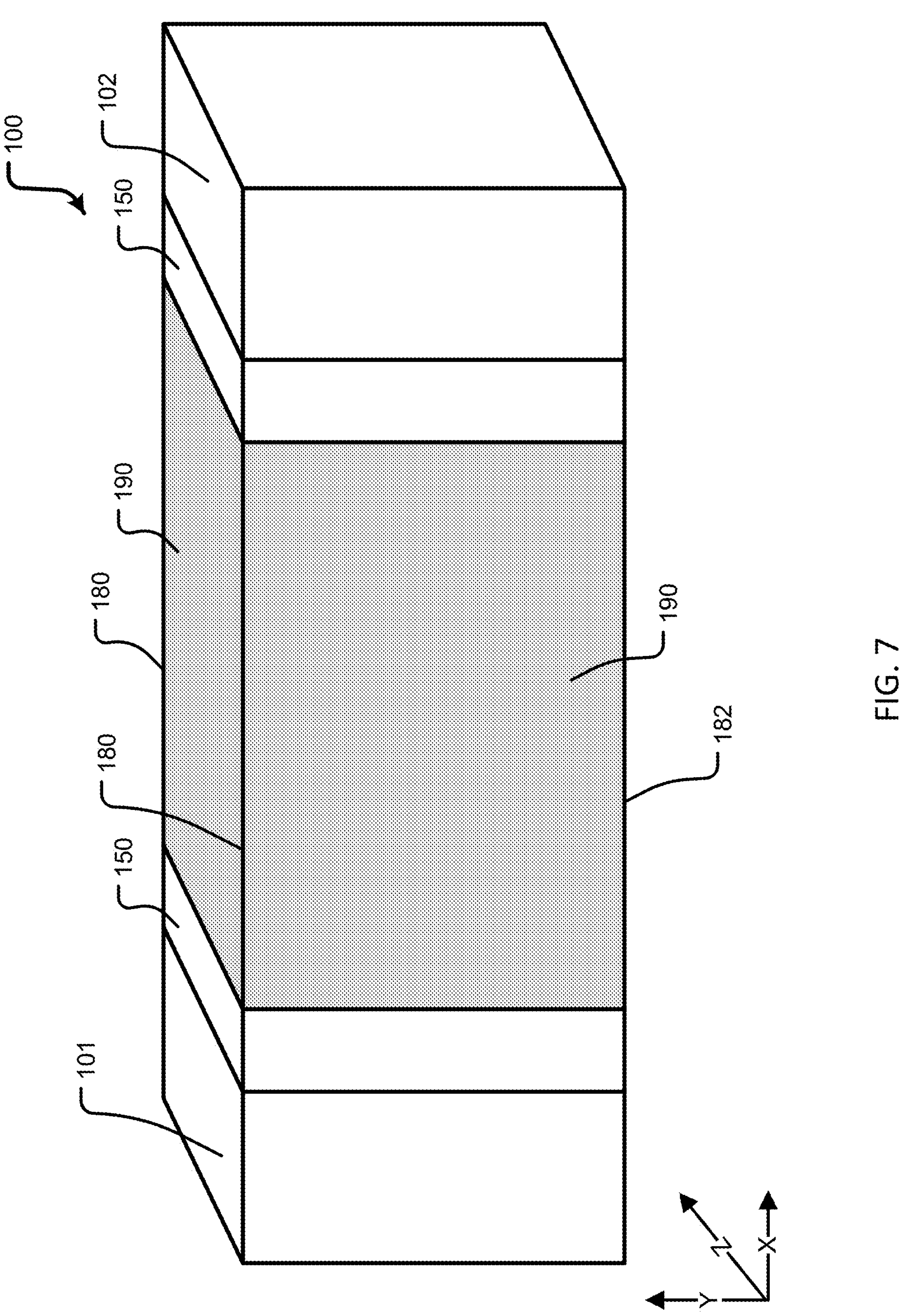
FIG. 7 illustrates a perspective view of a shielded capacitor according to aspects of the disclosure.

FIG. 7 illustrates a perspective view of a shielded capacitor according to aspects of the disclosure.

Figure 8:
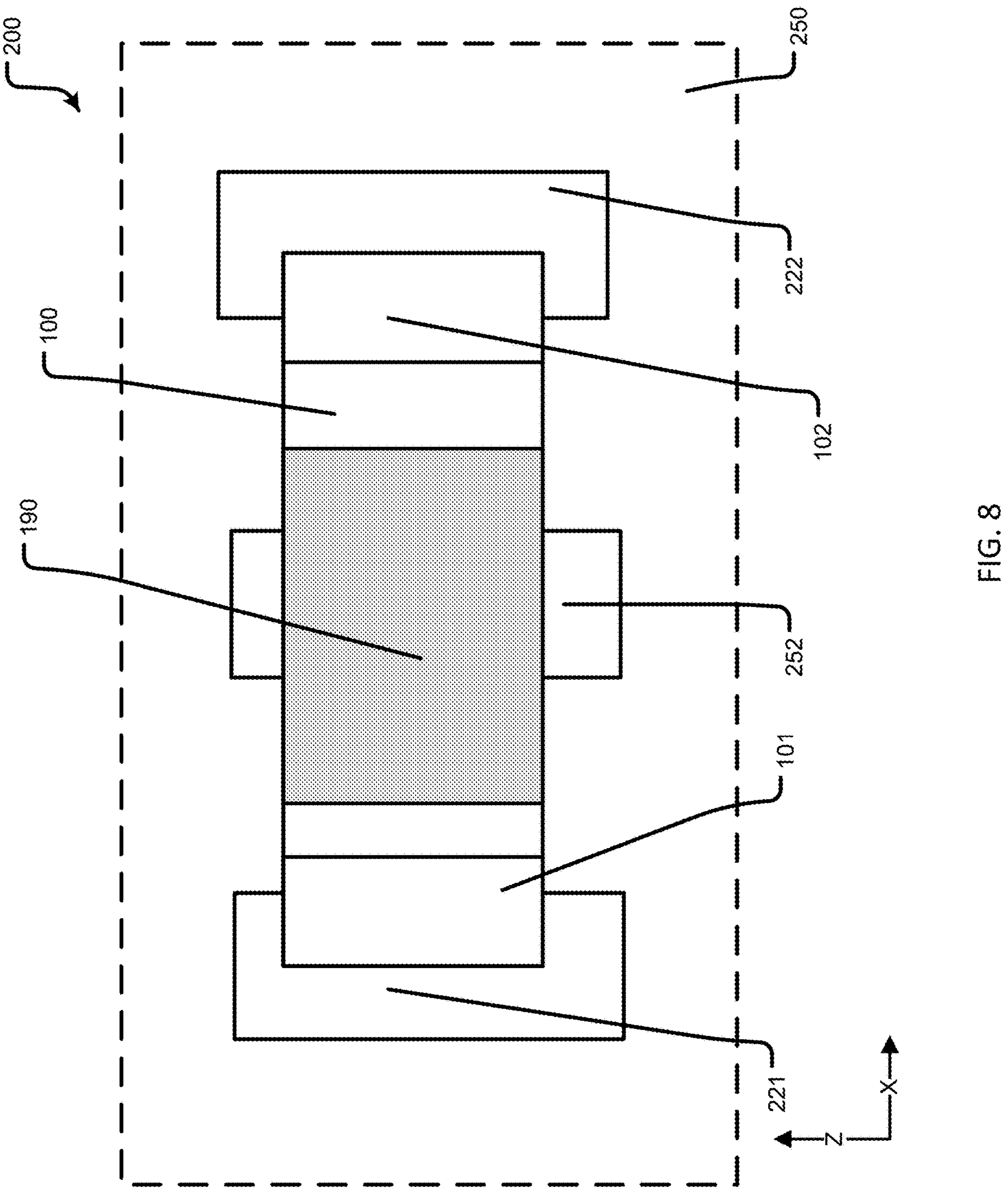
FIG. 8 illustrates a top view of the shielded capacitor and the device according to FIG. 7.

FIG. 8 illustrates a top view of the shielded capacitor and the device according to FIG. 7.

Figure 9:
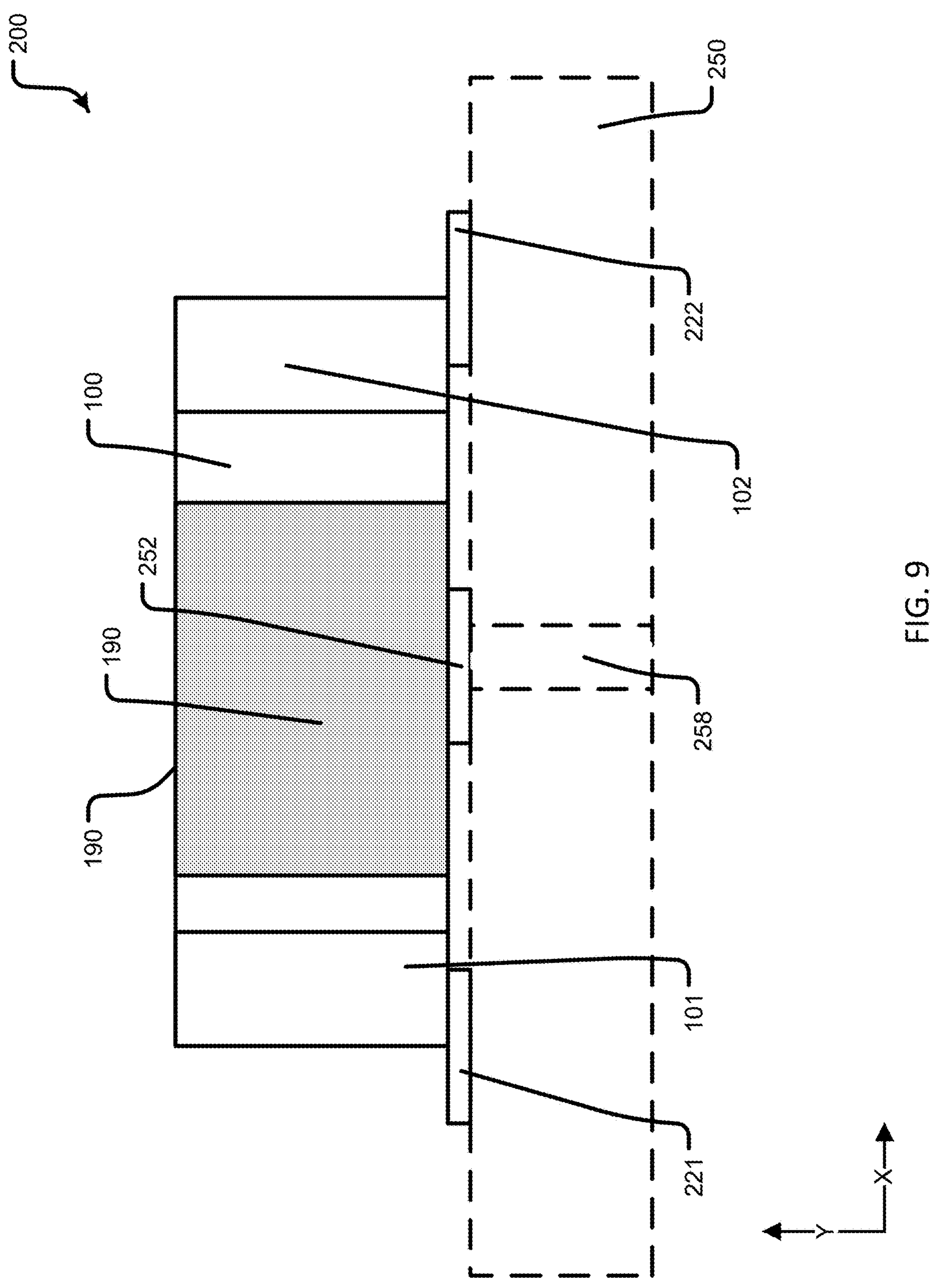
FIG. 9 illustrates a side view of the shielded capacitor and the device according to FIG. 7.

FIG. 9 illustrates a side view of the shielded capacitor and the device according to FIG. 7.

In particular, the aspects of FIG. 7, FIG. 8, and FIG. 9 may optionally include any other aspects of the shielded capacitor 100, the shielding structure 190, the device 200, the process of configuring a capacitor with shielding 300, the process of configuring a device with a shielded capacitor 400, and/or the like as described herein. In particular, FIG. 7 illustrates an implementation of the shielded capacitor 100 where the shielding structure 190 is electrically isolated from the second terminal 102 and is electrically isolated from the first terminal 101. In aspects not illustrated, the shielded capacitor 100 of FIG. 7 may implement the shielding structure 190 to be electrically connected to the first terminal 101. In aspects not illustrated, the shielded capacitor 100 of FIG. 7 may implement the shielding structure 190 to be electrically connected to the second terminal 102.

In particular aspects, the shielding structure 190 may be wrapped around one or more surfaces of the shielded capacitor 100. In aspects, the shielding structure 190 may wrap across a single surface of the shielded capacitor 100; the shielding structure 190 may wrap across two surfaces of the shielded capacitor 100; the shielding structure 190 may wrap across three surfaces of the shielded capacitor 100; the shielding structure 190 may wrap across four surfaces of the shielded capacitor 100; the shielding structure 190 may wrap across a plurality of surfaces of the shielded capacitor 100 between the first terminal 101 and the second terminal 102; and/or the like.

In particular aspects, the shielding structure 190 may be wrapped around one or more surfaces of the dielectric material 150. In aspects, the shielding structure 190 may wrap across a single surface of the dielectric material 150; the shielding structure 190 may wrap across two surfaces of the dielectric material 150; the shielding structure 190 may wrap across three surfaces of the dielectric material 150; the shielding structure 190 may wrap across four surfaces of the dielectric material 150; the shielding structure 190 may wrap across all surfaces of the dielectric material 150 between the first terminal 101 and the second terminal 102; and/or the like.

In particular aspects, the shielding structure 190 may longitudinally extend across the dielectric material 150 between the side edges 180 of the shielded capacitor 100 along the z-axis. In further aspects, the shielding structure 190 may extend laterally along the x-axis between the first terminal 101 and the second terminal 102. In further aspects, the shielding structure 190 may extend laterally along the x-axis with a portion of the dielectric material 150 free of the shielding structure 190 adjacent the first terminal 101 and the second terminal 102.

In further aspects, the shielding structure 190 may extend vertically along the y-axis from the side edges 180 to a lower edge 182 of the shielded capacitor 100. In further aspects, the shielding structure 190 may further extend across a bottom surface of the shielded capacitor 100 such that the shielding structure 190 wraps around at least four surfaces of the shielded capacitor 100. In aspects, the shielding structure 190 may be a continuous structure wrapping around the shielded capacitor 100. In aspects, the shielding structure 190 may be a continuous structure wrapping around the dielectric material 150.

FIG. 8 illustrates that in some aspects the shielding structure 190 may be connected to the substrate 250. In aspects, the substrate 250 may include a terminal 252. In aspects, the terminal 252 may be a ground terminal. As illustrated in FIG. 9, the terminal 252 may connect to at least one via 258. In aspects, the at least one via 258 may extend between the terminal 252 and a lower surface of the substrate 250. In aspects, the at least one via 258 may extend between the terminal 252 and a layer within the substrate 250. A connection between the shielding structure 190 and the terminal 252 may optionally include an adhesive, soldering, sintering, eutectic bonding, thermal compression bonding, ultrasonic bonding/welding, a clip component, and/or the like as described herein.

The at least one via 258 may comprise a metallic material such as copper, gold, nickel, palladium, silver, and the like, and combinations thereof. The at least one via 258 may have an axis that may be located in a plane generally parallel to the y-axis.

Figure 10:
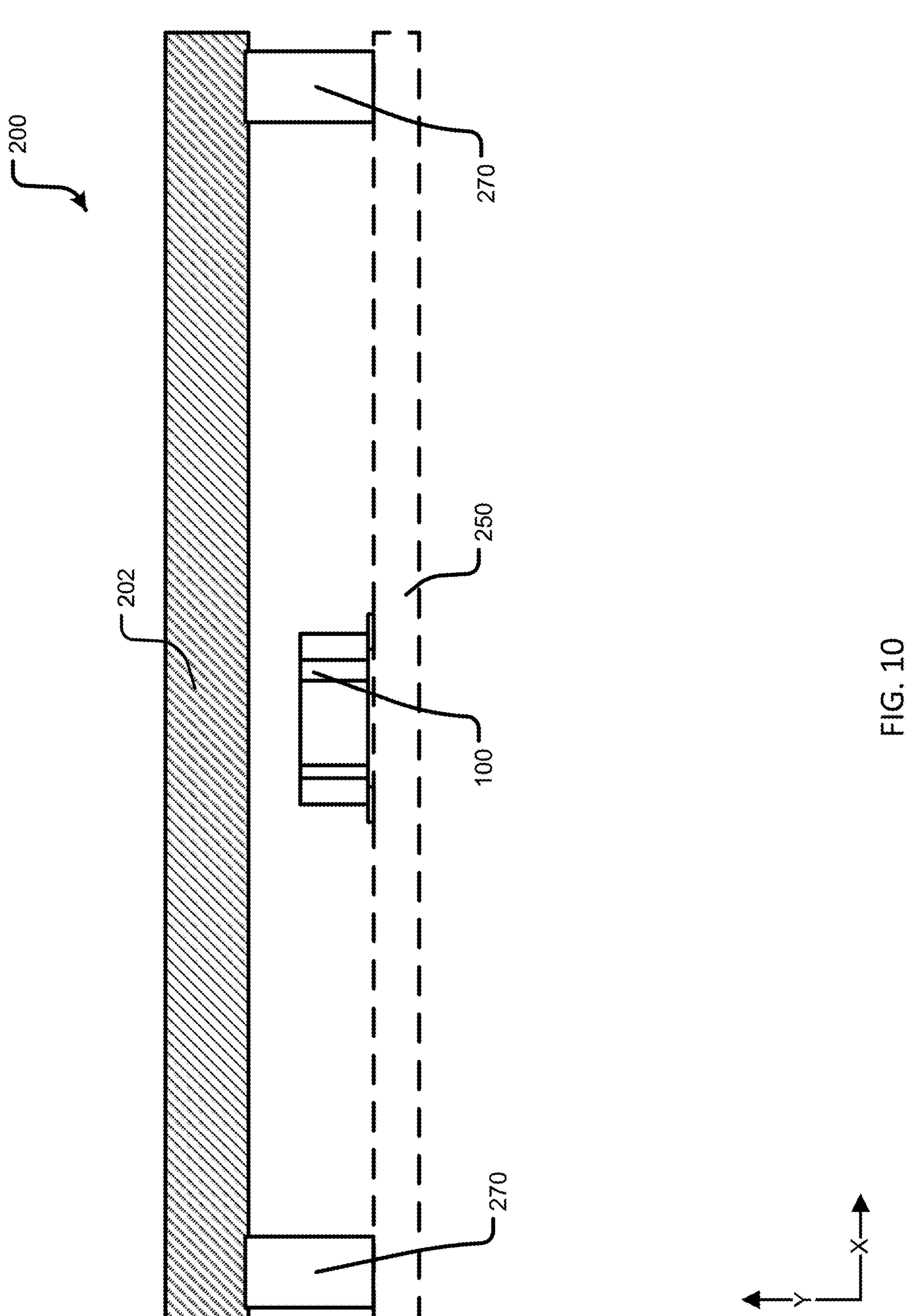
FIG. 10 illustrates a side view of the device according to aspects of the disclosure.

FIG. 10 illustrates a side view of the device according to aspects of the disclosure.

In particular, FIG. 10 illustrates a side view of the device 200 according to aspects of the disclosure. In particular, the aspects of FIG. 10 may optionally include any other aspects of the shielded capacitor 100, the shielding structure 190, the device 200, the process of configuring a capacitor with shielding 300, the process of configuring a device with a shielded capacitor 400, and/or the like as described herein.

In particular, the device 200 may include support stands 270. The support stands 270 may be arranged on edges of the substrate 250 with one or more implementations of the shielded capacitor 100 arranged therebetween. The support stands 270 may support the metallic structure 202. In particular, the support stands 270 may provide mechanical support for the metallic structure 202.

In particular aspects, the support stands 270 may be attached to an upper surface of the substrate 250 with adhesive, soldering, sintering, eutectic bonding, ultrasonically welding, and/or the like as described herein. In particular aspects, the support stands 270 may be directly attached to an upper surface of the substrate 250. In particular aspects, the support stands 270 may be indirectly attached to an upper surface of the substrate 250 with one or more intervening components including metal surfaces.

Further, the support stands 270 may be attached to a lower surface of the metallic structure 202 with adhesive, soldering, sintering, eutectic bonding, ultrasonically welding, and/or the like as described herein. In particular aspects, the support stands 270 may be directly attached to a lower surface of the metallic structure 202. In particular aspects, the support stands 270 may be indirectly attached to a lower surface of the metallic structure 202 with one or more intervening components including metal surfaces.

Figure 11:
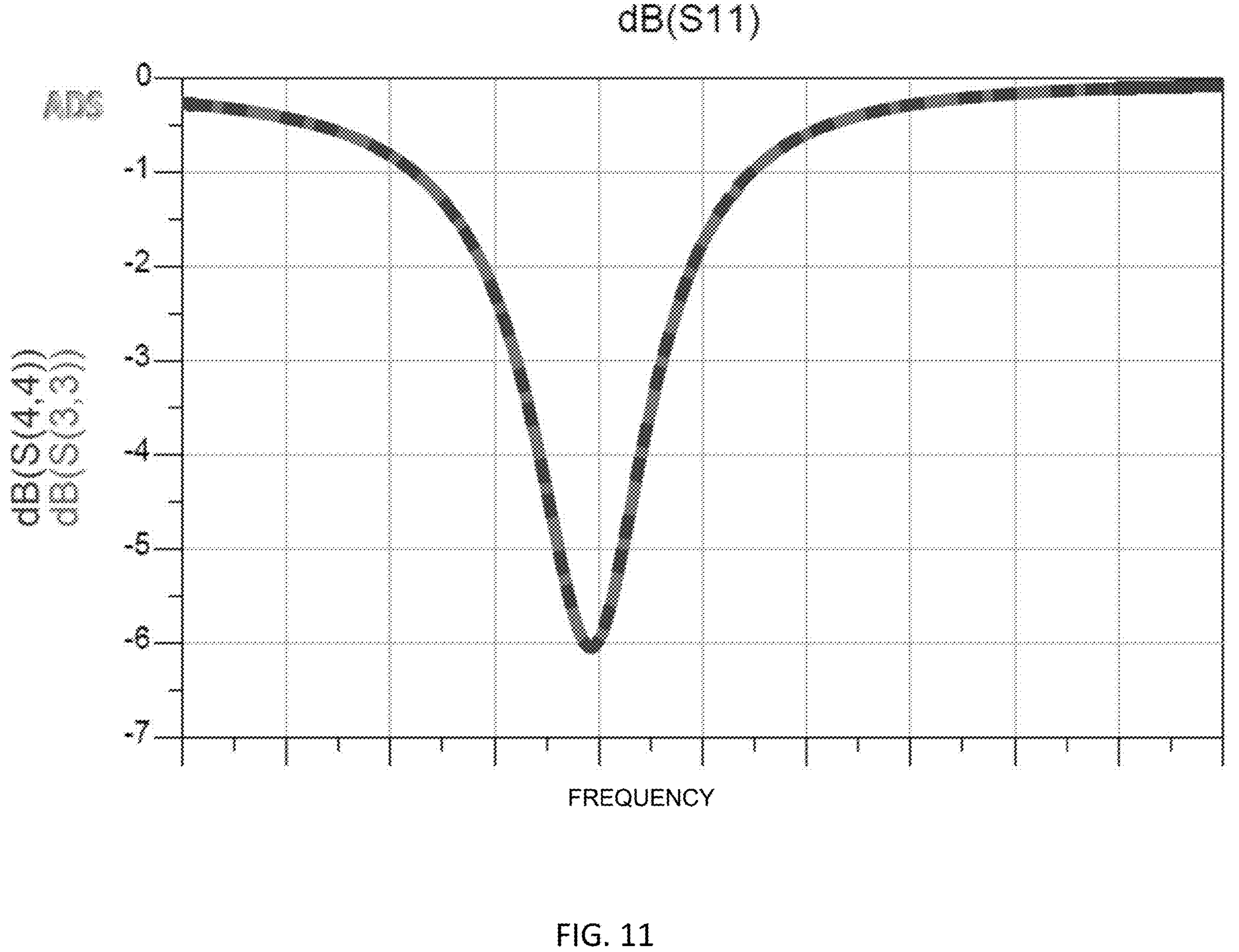
FIG. 11 illustrates exemplary simulated scattering parameters of the shielded capacitor implemented without the metallic structure and the shielded capacitor implemented with the metallic structure across a range of frequencies according to aspects of the disclosure.

FIG. 11 illustrates exemplary simulated scattering parameters of the shielded capacitor implemented without the metallic structure and the shielded capacitor implemented with the metallic structure across a range of frequencies according to aspects of the disclosure.

Figure 12:
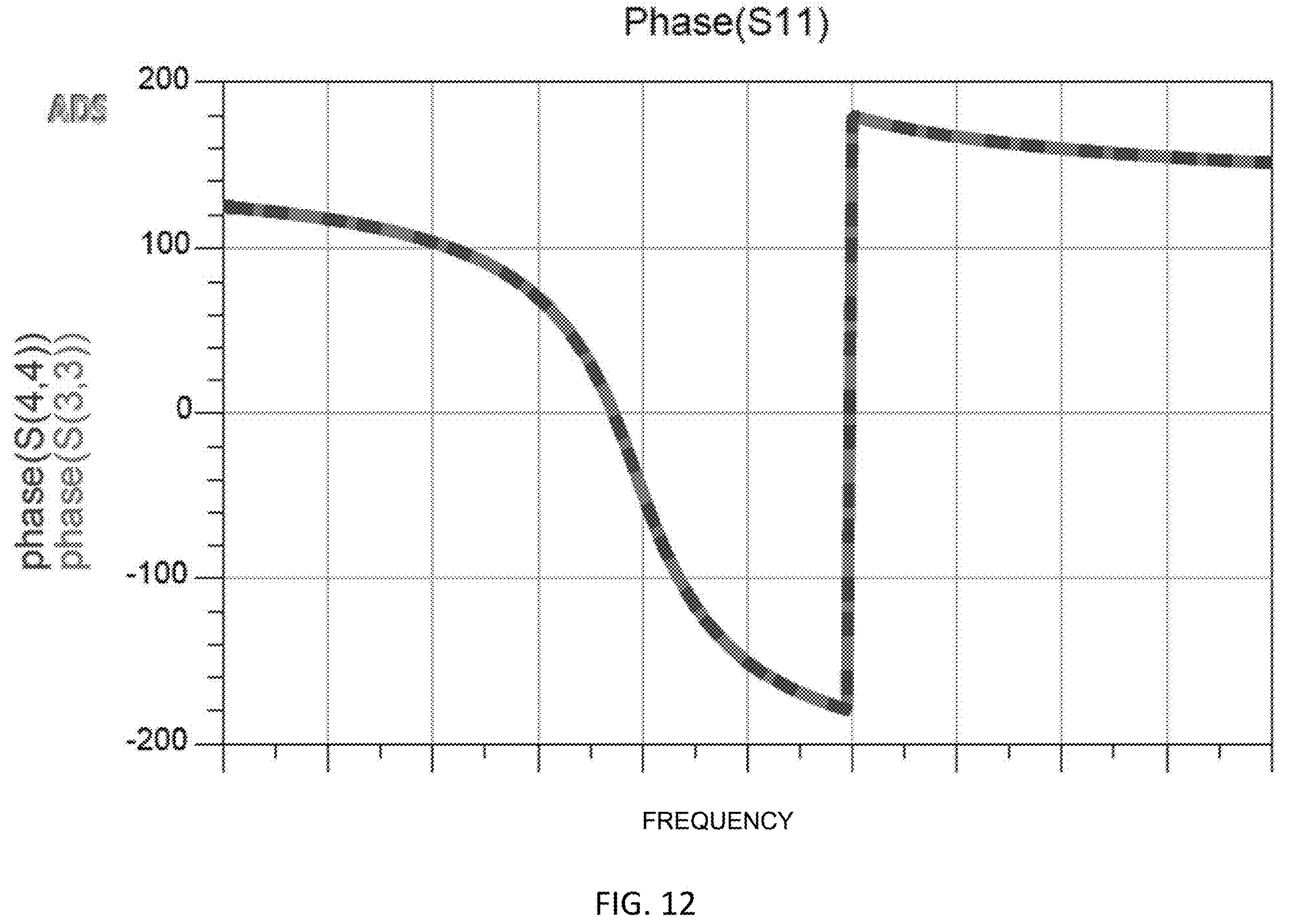
FIG. 12 illustrates additional exemplary simulated scattering parameters of the shielded capacitor implemented without the metallic structure and the shielded capacitor implemented with the metallic structure across a range of frequencies according to aspects of the disclosure.

FIG. 12 illustrates additional exemplary simulated scattering parameters of the shielded capacitor implemented without the metallic structure and the shielded capacitor implemented with the metallic structure across a range of frequencies according to aspects of the disclosure.

In particular, FIG. 11 and FIG. 12 illustrate exemplary simulated scattering parameters of the shielded capacitor 100 implemented without the metallic structure 202 and the shielded capacitor 100 implemented with the metallic structure 202 across a range of frequencies according to aspects of the disclosure.

As illustrated in FIG. 11 and FIG. 12, implementation of the shielded capacitor 100 with the shielding structure 190 whether with or without the metallic structure 202 arranged in proximity to the shielded capacitor 100 results in no resonance shift as illustrated by the exemplary simulated scattering parameters being equivalent or generally equivalent.

Figure 13:
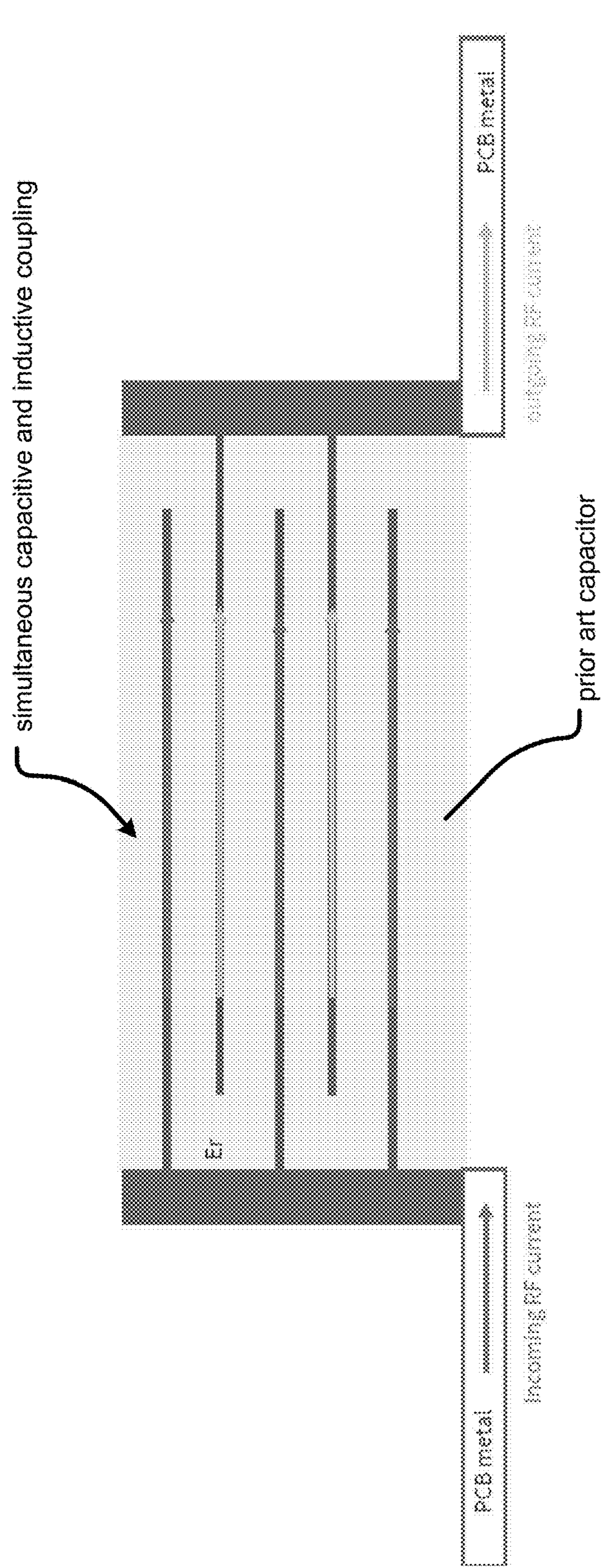
FIG. 13 schematically illustrates exemplary simultaneous capacitive and inductive coupling between electrodes of a prior art capacitor without an implementation of the metallic structure and the shielding structure.

FIG. 13 schematically illustrates exemplary simultaneous capacitive and inductive coupling between electrodes of a prior art capacitor without an implementation of the metallic structure and the shielding structure.

In particular, FIG. 13 schematically illustrates exemplary simultaneous capacitive and inductive coupling between electrodes of a prior art capacitor without an implementation of the metallic structure 202 and the shielding structure 190. As illustrated in FIG. 13, the prior art capacitor may receive an incoming RF current and may deliver an outgoing RF current. As illustrated in FIG. 13, the various metals of the prior art capacitor may experience simultaneous capacitive and inductive coupling between electrodes of the prior art capacitor without an implementation of the metallic structure 202.

Figure 14:
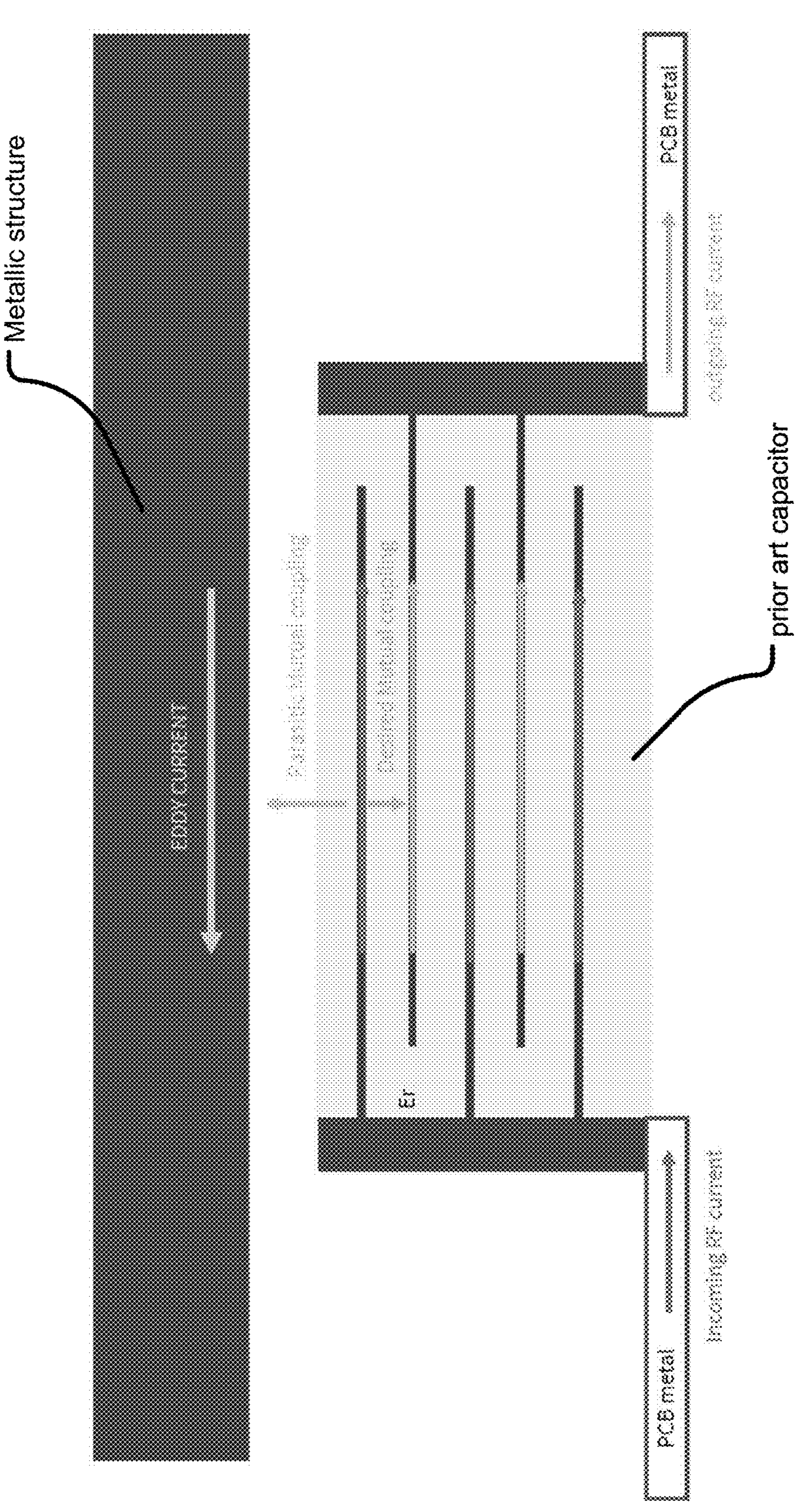
FIG. 14 schematically illustrates a desired mutual coupling and an undesirable parasitic mutual coupling between electrodes of a prior art capacitor with an implementation of a metallic structure.

FIG. 14 schematically illustrates a desired mutual coupling and an undesirable parasitic mutual coupling between electrodes of a prior art capacitor with an implementation of a metallic structure.

As illustrated in FIG. 14, the prior art capacitor may receive an incoming RF current and may deliver an outgoing RF current. As illustrated in FIG. 14, the various metals of the prior art capacitor may experience a mutual coupling between electrodes of the prior art capacitor. Additionally, with an implementation of a metallic structure, the prior art capacitor may also experience an undesirable parasitic mutual coupling.

In this regard, the parasitic mutual coupling comes as a subtraction to the desired mutual coupling. Therefore, the presence of a metallic structure can generate a decrease of the mutual coupling. The decrease in mutual coupling lowers slightly the ESL (Equivalent Series Inductance) which moves the resonance frequency upwards. Accordingly, a metallic structure may impact a performance of the prior art capacitor and accordingly impact a performance of the device. In this regard, as disclosed herein, implementation of the shielding structure 190 in the shielded capacitor 100 reduces a parasitic mutual coupling generated by a presence of the metallic structure 202.

Figure 15:
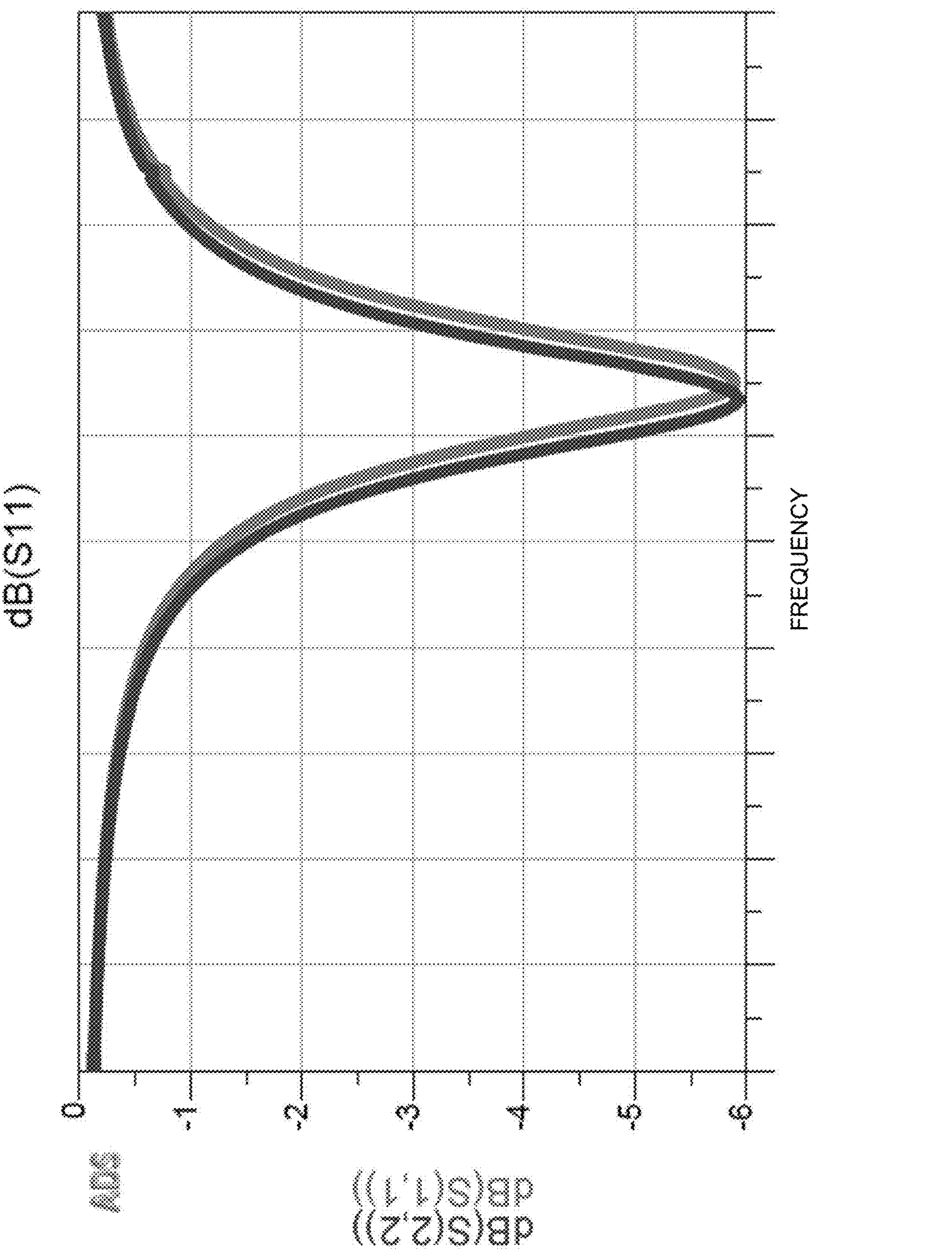
FIG. 15 illustrates exemplary simulated scattering parameters of the shielded capacitor implemented with the metallic structure and a prior art capacitor implemented with the metallic structure across a range of frequencies according to aspects of the disclosure.

FIG. 15 illustrates exemplary simulated scattering parameters of the shielded capacitor implemented with the metallic structure and a prior art capacitor implemented with the metallic structure across a range of frequencies according to aspects of the disclosure.

Figure 16:
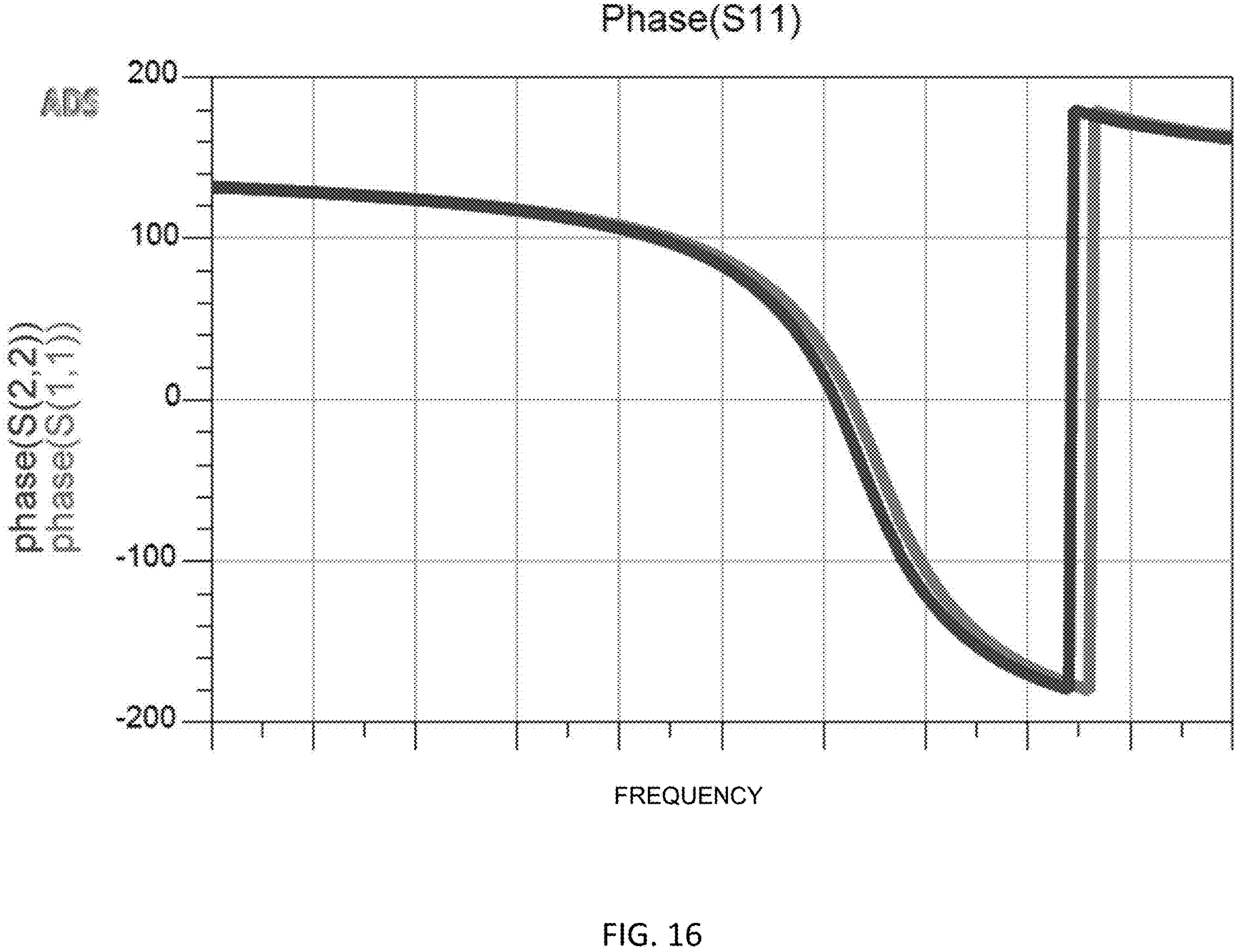
FIG. 16 illustrates additional exemplary simulated scattering parameters of the shielded capacitor implemented with the metallic structure and a prior art capacitor implemented with a metallic structure across a range of frequencies according to aspects of the disclosure.

FIG. 16 illustrates additional exemplary simulated scattering parameters of the shielded capacitor implemented with the metallic structure and a prior art capacitor implemented with a metallic structure across a range of frequencies according to aspects of the disclosure.

In particular, FIG. 15 and FIG. 16 illustrate exemplary simulated scattering parameters of the shielded capacitor 100 implemented with the metallic structure 202 and a prior art capacitor implemented with the metallic structure 202 across a range of frequencies according to aspects of the disclosure.

As illustrated in FIG. 15 and FIG. 16, the exemplary simulated scattering parameters show a shift in resonance between the shielded capacitor 100 implemented with the metallic structure 202 and a prior art capacitor implemented with the metallic structure 202.

With respect to FIGS. 1-10, aspects of the device 200 may be implemented as a RF package, a RF amplifier package, a RF power amplifier package, a RF power transistor package, a RF power amplifier transistor package, and/or the like. In aspects, the device 200 may include a ceramic body and one or more metal contacts. In aspects, the shielded capacitor 100 may be implemented as part of matching networks, harmonic termination circuitry, and/or the like. In aspects, the shielded capacitor 100 may be used for matching networks, pre-matching, bias-decoupling, thermal-grounding, and/or the like in RF power products and/or the like.

With respect to FIGS. 1-10, aspects of the device 200 may be implemented to include an open cavity configuration (not shown) suitable for use with the shielded capacitor 100 of the disclosure. In particular, the open cavity configuration may utilize an open cavity package design. In some aspects, the open cavity configuration may include a lid or other enclosure for protecting interconnects, circuit components, the shielded capacitor 100, the one or more semiconductor devices, and/or the like.

With respect to FIGS. 1-10, aspects of the device 200 may include an over-mold, one or more input/output pins, and/or the like (not shown). The over-mold may substantially surround the shielded capacitor 100, one or more semiconductor devices, and/or the like. The over-mold may be formed of a plastic or a plastic polymer compound, which may be injection molded around the shielded capacitor 100, and/or the like, thereby providing protection from the outside environment. In one aspect, the over-mold configuration may substantially surround the one or more semiconductor devices, the shielded capacitor 100, and/or the like. The over-mold configuration may be formed of a plastic, a mold compound, a plastic compound, a polymer, a polymer compound, a plastic polymer compound, and/or the like. The over-mold configuration may be injection molded, transfer molded, and/or compression molded around the one or more semiconductor devices, the shielded capacitor 100, and/or the like from the outside environment.

With respect to FIGS. 1-10, aspects of the device 200 may include one or more semiconductor devices (not shown) that may be implemented as one or more of a wide band-gap semiconductor device, an ultra-wideband device, a GaN based device, a LDMOS (Laterally-Diffused Metal-Oxide Semiconductor) device, a Metal Semiconductor Field-Effect Transistor (MESFET), a Metal Oxide Field Effect Transistor (MOSFET), a Junction Field Effect Transistor (JFET), a Bipolar Junction Transistor (BJT), an Insulated Gate Bipolar Transistor (IGBT), a high-electron-mobility transistor (HEMT), a Wide Band Gap (WBG) semiconductor, a power module, a gate driver, a component such as a General-Purpose Broadband component, a Telecom component, a L-Band component, a S-Band component, a X-Band component, a C-Band component, a Ku-Band component, a Satellite Communications component, a Doherty configuration, and/or the like.

Figure 17:
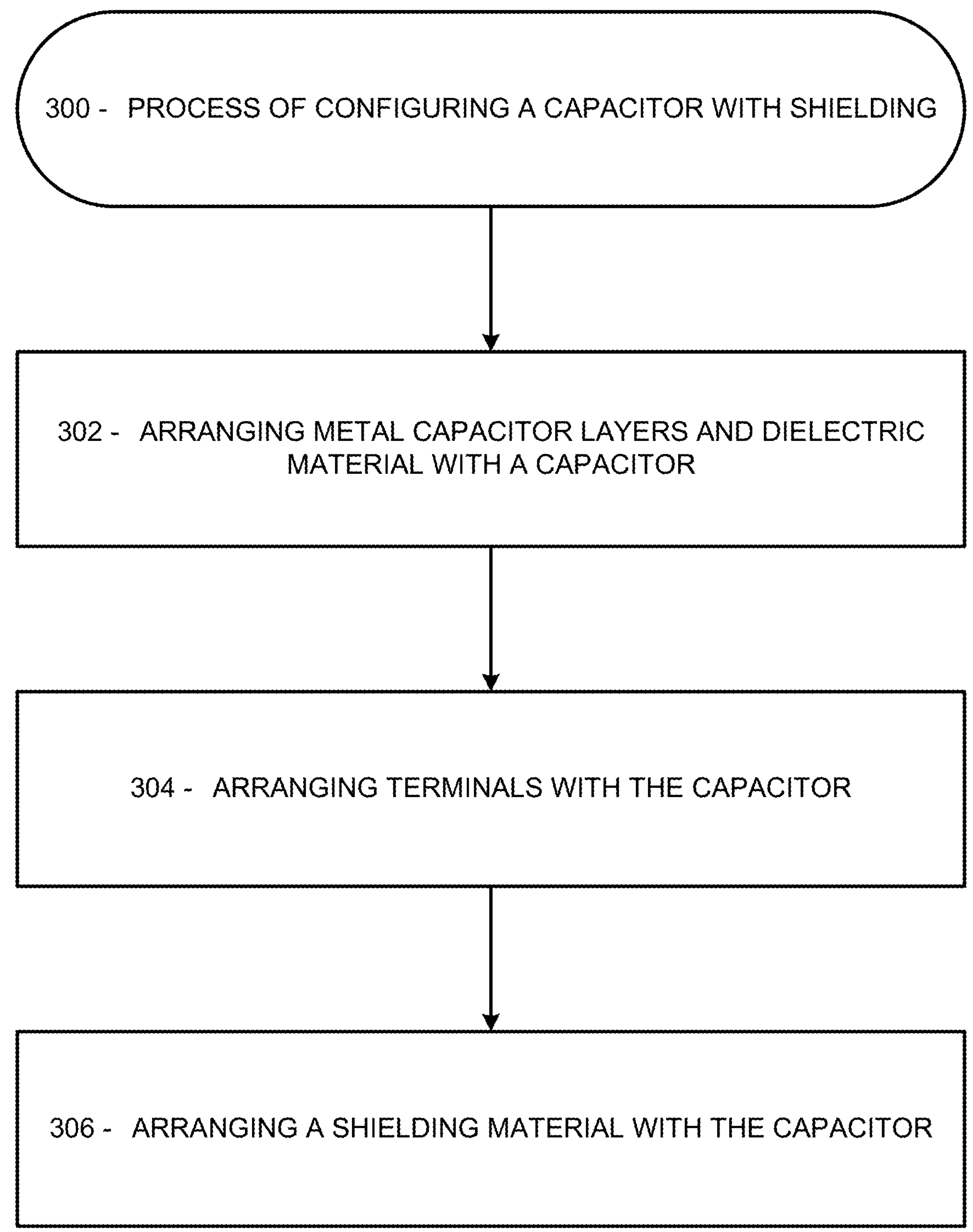
FIG. 17 illustrates a process of configuring a capacitor with shielding according to aspects of the disclosure.

FIG. 17 illustrates a process of configuring a capacitor with shielding according to aspects of the disclosure.

In particular, FIG. 17 illustrates a process of configuring a capacitor with shielding 300 according to aspects of the disclosure. In particular, it should be noted that the process of configuring a capacitor with shielding 300 is merely exemplary and may be modified consistent with the various aspects disclosed herein. Moreover, the process of configuring a capacitor with shielding 300 may include a process of manufacturing the shielded capacitor 100. It should be noted that the process of configuring a capacitor with shielding 300 may be performed in a different order consistent with the aspects described above. Moreover, the process of configuring a capacitor with shielding 300 may be modified to have more or fewer process steps consistent with the various aspects disclosed herein.

The process of configuring a capacitor with shielding 300 may include arranging metal capacitor layers and dielectric material with a capacitor 302. In this regard, the arranging metal capacitor layers and dielectric material with a capacitor 302 may include any one or more materials, structures, arrangements, processes, and/or the like as described herein. Moreover, one or more proceeding or subsequent processes may also be implemented with respect to the arranging metal capacitor layers and dielectric material with a capacitor 302 consistent with the disclosure.

In particular aspects, the arranging metal capacitor layers and dielectric material with a capacitor 302 may include arranging first capacitor metals and second capacitor metals within the dielectric material 150 of the shielded capacitor 100. More specifically, arranging the first upper capacitor metal 121, the first capacitor metal 131, the first lower capacitor metal 111, the second upper capacitor metal 122, the second lower capacitor metal 112, and/or the like within the dielectric material 150 of the shielded capacitor 100 as disclosed herein.

The process of configuring a capacitor with shielding 300 may include arranging terminals with the capacitor 304. In this regard, the arranging terminals with the capacitor 304 may include any one or more materials, structures, arrangements, processes, and/or the like as described herein. Moreover, one or more proceeding or subsequent processes may also be implemented with respect to the arranging terminals with the capacitor 304 consistent with the disclosure.

In particular aspects, the arranging terminals with the capacitor 304 may include arranging the first terminal 101 and the second terminal 102 on the shielded capacitor 100. Additionally, connecting the first upper capacitor metal 121, the first capacitor metal 131, the first lower capacitor metal 111, and/or the like to the first terminal 101; and connecting the second upper capacitor metal 122, the second lower capacitor metal 112, and/or the like to the second terminal 102.

The process of configuring a capacitor with shielding 300 may include arranging a shielding material with the capacitor 306. In this regard, the arranging a shielding material with the capacitor 306 may include any one or more materials, structures, arrangements, processes, and/or the like as described herein. Moreover, one or more proceeding or subsequent processes may also be implemented with respect to the arranging a shielding material with the capacitor 306 consistent with the disclosure.

In particular aspects, the arranging a shielding material with the capacitor 306 may include arranging the shielding structure 190 with the shielded capacitor 100, which may include arranging the shielding structure 190 on or within the dielectric material 150. Further, the shielding structure 190 may be arranged on one surface or more than one surface of the shielded capacitor 100 and/or the dielectric material 150. In particular aspects, the arranging a shielding material with the capacitor 306 may include configuring the first upper capacitor metal 121 as the shielding structure 190 as described herein.

In particular aspects, the arranging a shielding material with the capacitor 306 may include arranging the shielding structure 190 with a metal layer, a sputtered metal layer, a plurality of metal layers, a plurality of sputtered metal layers, and/or the like. In aspects, the shielding structure 190 may be include various metal materials including one or more of aluminum, copper, silver, gold, and/or the like. In one aspect, the shielding structure 190 may be a sputtered metal layer.

In particular aspects, the arranging a shielding material with the capacitor 306 may include sputtering at least one metal layer to form the shielding structure 190 In aspects, the shielding structure 190 may be include various metal materials including one or more of aluminum, copper, silver, gold, and/or the like. In one aspect, the shielding structure 190 may be a sputtered metal layer.

Figure 18:
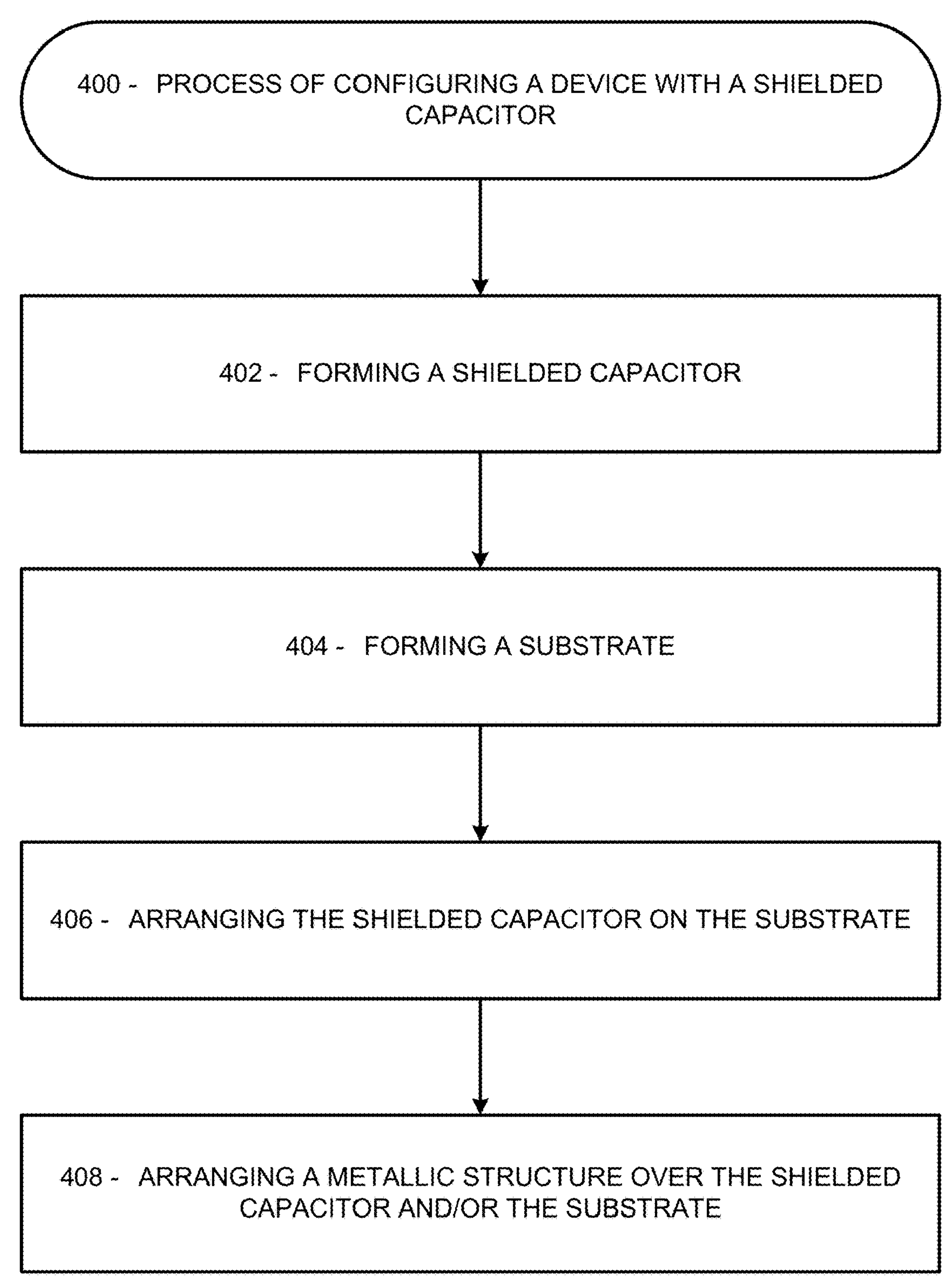
FIG. 18 illustrates a process of configuring a device with a shielded capacitor according to aspects of the disclosure.

FIG. 18 illustrates a process of configuring a device with a shielded capacitor according to aspects of the disclosure.

In particular, FIG. 18 illustrates a process of configuring a device with a shielded capacitor 400. In particular, it should be noted that the process of configuring a device with a shielded capacitor 400 is merely exemplary and may be modified consistent with the various aspects disclosed herein. Moreover, the process of configuring a device with a shielded capacitor 400 of the disclosure may include a process of manufacturing the device 200. It should be noted that the process of configuring a device with a shielded capacitor 400 may be performed in a different order consistent with the aspects described above. Moreover, the process of configuring a device with a shielded capacitor 400 may be modified to have more or fewer process steps consistent with the various aspects disclosed herein.

The process of configuring a device with a shielded capacitor 400 of the disclosure may include forming a shielded capacitor 402. In this regard, the forming a shielded capacitor 402 may include any one or more materials, structures, arrangements, processes, and/or the like as described herein. Moreover, one or more proceeding or subsequent processes may also be implemented with respect to the forming a shielded capacitor 402 consistent with the disclosure.

In particular aspects, the forming a shielded capacitor 402 may include forming the shielded capacitor 100 as described herein. In particular aspects, the forming a shielded capacitor 402 may include the process of configuring a capacitor with shielding 300 as described herein with reference to FIG. 17.

The process of configuring a device with a shielded capacitor 400 of the disclosure may include forming a substrate 404. In this regard, the forming a substrate 404 may include any one or more materials, structures, arrangements, processes, and/or the like as described herein. Moreover, one or more proceeding or subsequent processes may also be implemented with respect to the forming a substrate 404 consistent with the disclosure.

In particular aspects, the forming a substrate 404 may include forming the substrate 250 as described herein. In particular aspects, the forming a substrate 404 may include forming the substrate 250 with the first terminal 221, the terminal 252, the second terminal 222, the at least one via 258, and/or the like as described herein.

The process of configuring a device with a shielded capacitor 400 of the disclosure may include arranging the shielded capacitor on the substrate 406. In this regard, the arranging the shielded capacitor on the substrate 406 may include any one or more materials, structures, arrangements, processes, and/or the like as described herein. Moreover, one or more proceeding or subsequent processes may also be implemented with respect to the arranging the shielded capacitor on the substrate 406 consistent with the disclosure.

In particular aspects, the arranging the shielded capacitor on the substrate 406 may include arranging the shielded capacitor 100 on the substrate 250. In particular aspects, the arranging the shielded capacitor on the substrate 406 may include arranging the shielded capacitor 100 on the first terminal 221, the terminal 252, the second terminal 222, and/or the like of the substrate 250. In particular aspects, the arranging the shielded capacitor on the substrate 406 may include connecting the shielded capacitor 100 to the first terminal 221, the terminal 252, the second terminal 222, and/or the like of the substrate 250.

The process of configuring a device with a shielded capacitor 400 of the disclosure may include arranging a metallic structure over the shielded capacitor and/or the substrate 408. In this regard, the arranging a metallic structure over the shielded capacitor and/or the substrate 408 may include any one or more materials, structures, arrangements, processes, and/or the like as described herein. Moreover, one or more proceeding or subsequent processes may also be implemented with respect to the arranging a metallic structure over the shielded capacitor and/or the substrate 408 consistent with the disclosure.

In particular aspects, the arranging a metallic structure over the shielded capacitor and/or the substrate 408 may include arranging the metallic structure 202 over the shielded capacitor 100 and/or the substrate 250. In particular aspects, the arranging a metallic structure over the shielded capacitor and/or the substrate 408 may include arranging the metallic structure 202 on the support stands 270 over the shielded capacitor 100 and/or the substrate 250.

The process of configuring a device with a shielded capacitor 400 may include implementing a reflow process with one or more components of the device 200 arranged in a panel. The process of configuring a device with a shielded capacitor 400 may include cutting the panel utilizing cutting equipment such as wafer, circuit board, or package sawing equipment to singulate the one or more components of the device 200 from the panel or the wafer, which may have the advantage that the one or more components of the device 200 may be loaded to attachment equipment for subsequent assembly the device 200.

In one aspect, the process of configuring a device with a shielded capacitor 400 may include processing utilizing a surface mount technology (SMT) line for the one or more components of the device 200, which may include the shielded capacitor 100. A surface mount technology (SMT) line may utilize numerous processes including solder printing, component placement, solder reflow, and/or the like, additional processes may include a flux cleaning step to remove all flux residues, wire bonding, dicing, mounting to dicing tape, dicing, either mechanical sawing or laser cutting, or a combination of both, and component testing. Additionally, the one or more components of the device 200, which may include the shielded capacitor 100, may be arranged on dicing tape that may then serve as input for die attach equipment.

The process of configuring a device with a shielded capacitor 400 may include a process of forming one or more interconnects between one or more components of the device 200 that may include forming one or more wires, leads, vias, edge platings, circuit traces, tracks, and/or the like. In one aspect, the process may include connecting the one or more interconnects by an adhesive, soldering, sintering, eutectic bonding, ultrasonic welding, a clip component, and/or the like as described herein.

The process of configuring a device with a shielded capacitor 400 may include a process of enclosing the device 200 as a package. More specifically, the device 200 may be configured as a package by forming an open cavity configuration, an over-mold configuration, or the like.

Figure 19:
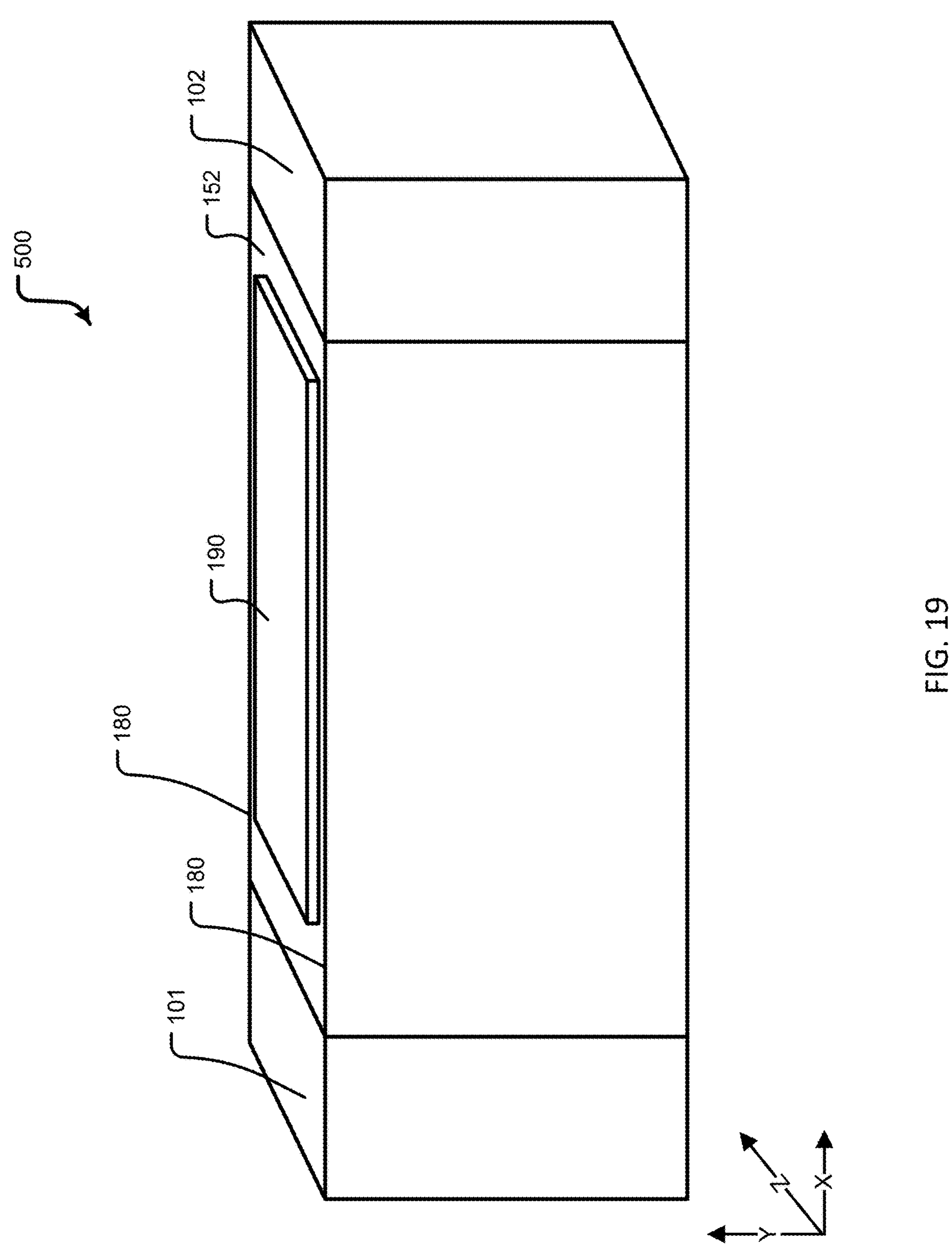
FIG. 19 illustrates a perspective view of a shielded component according to aspects of the disclosure.

FIG. 19 illustrates a perspective view of a shielded component according to aspects of the disclosure.

Figure 20:
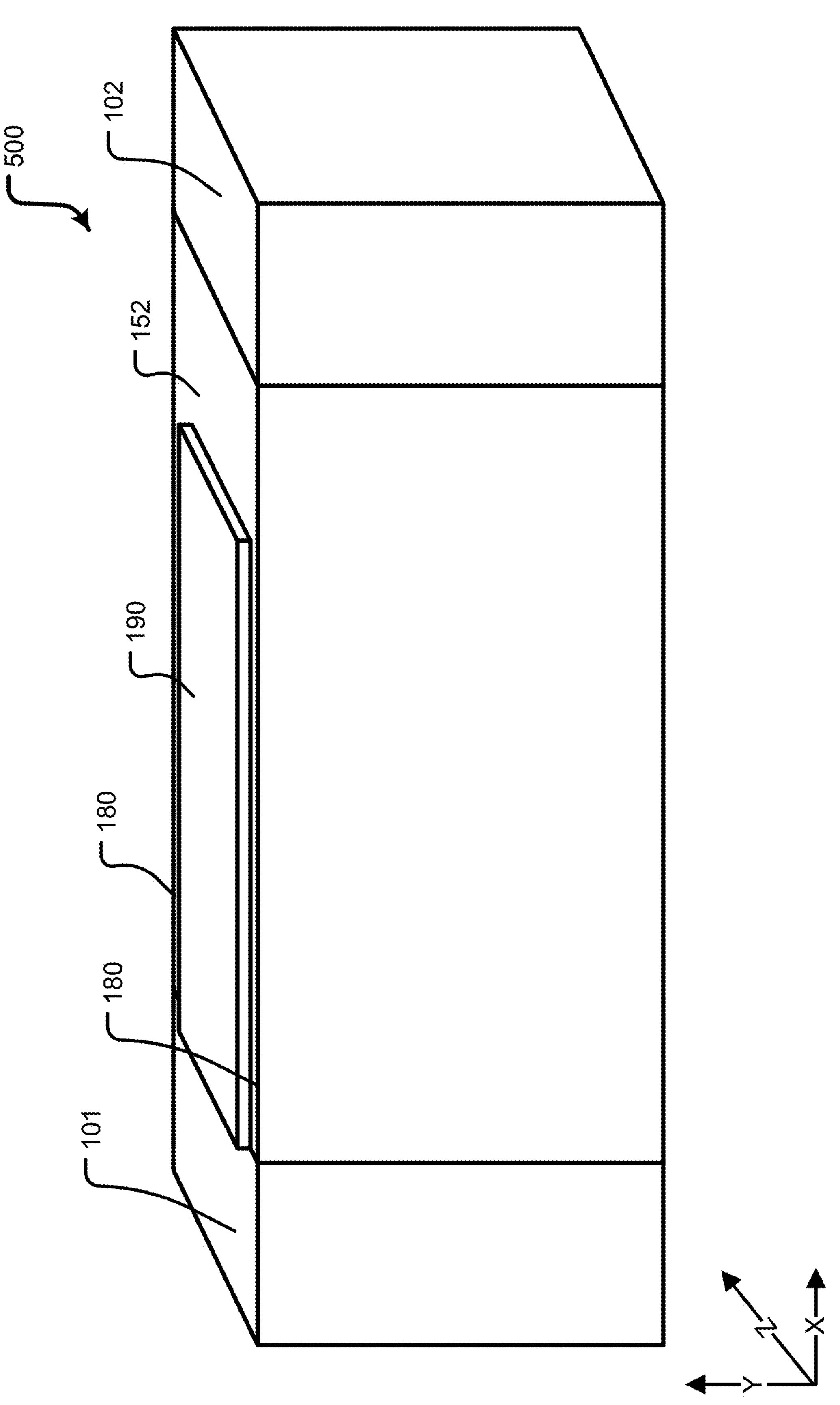
FIG. 20 illustrates a perspective view of another shielded component according to aspects of the disclosure.

FIG. 20 illustrates a perspective view of another shielded component according to aspects of the disclosure.

Figure 21:
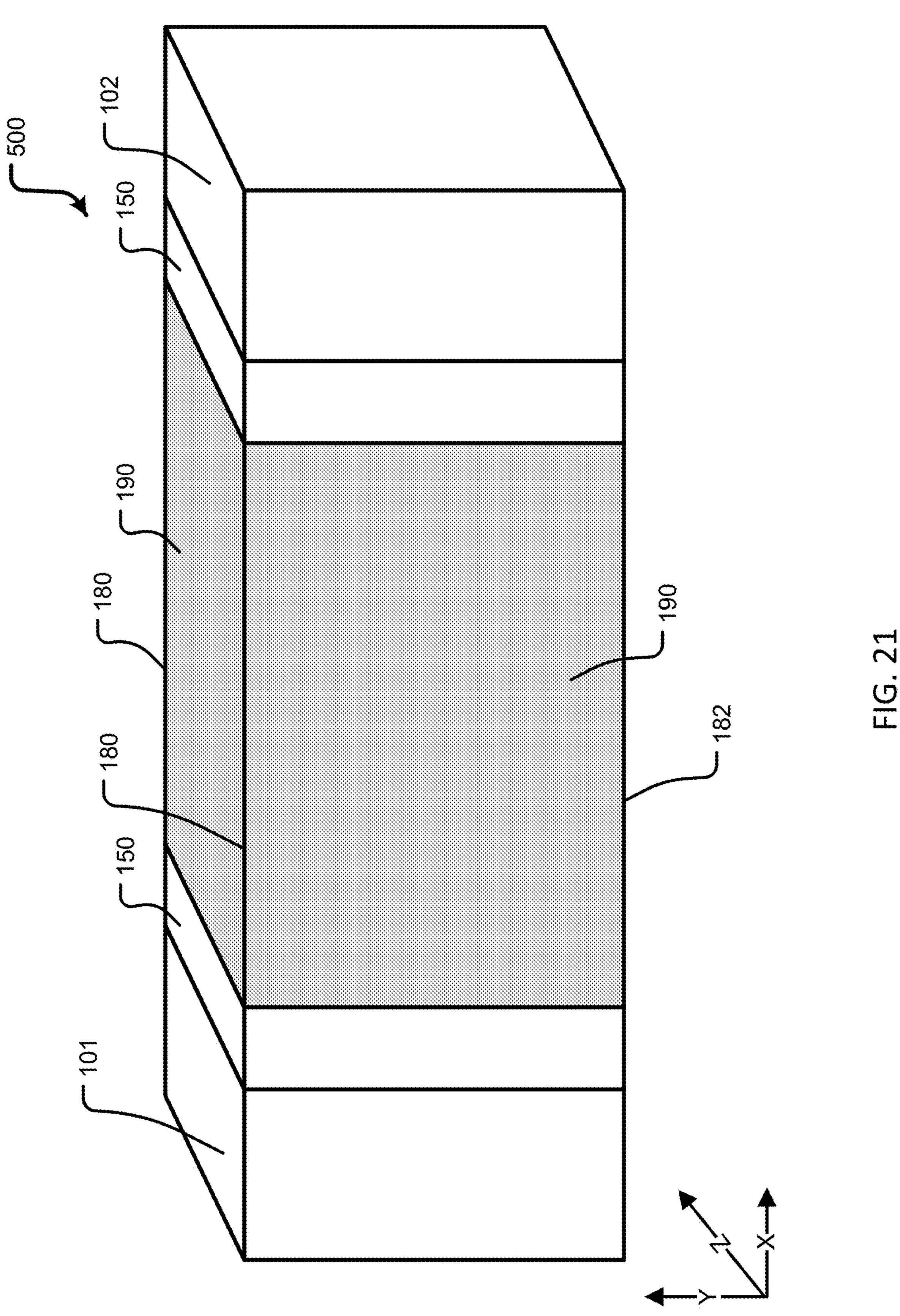
FIG. 21 illustrates a perspective view of another shielded component according to aspects of the disclosure.

FIG. 21 illustrates a perspective view of another shielded component according to aspects of the disclosure.

In particular, FIG. 19, FIG. 20, and FIG. 21 illustrate various implementations of a shielded component 500 according to aspects of the disclosure. In particular, the shielded component 500 may include the first terminal 101 and the second terminal 102 as described herein. Further, the shielded component 500 may include the shielding structure 190 as described herein.

In particular, the aspects of the shielded component 500 illustrated in FIG. 19, FIG. 20, and/or FIG. 21 may optionally include any other aspects of the shielded capacitor 100, the shielding structure 190, the device 200, the process of configuring a capacitor with shielding 300, the process of configuring a device with a shielded capacitor 400, and/or the like as described herein.

In aspects, the shielded component 500 may be implemented in the device 200. In aspects, the shielded component 500 may be implemented in the device 200 together with the shielded capacitor 100. In aspects, the shielded component 500 may include the shielding structure 190 that may be arranged with the shielded component 500 consistent with the arrangement of the shielding structure 190 with the shielded capacitor 100. In aspects, the shielded component 500 may include the shielding structure 190 that may be arranged with the shielded component 500 consistent with the process of configuring a capacitor with shielding 300. In aspects, the shielded component 500 may include the shielding structure 190 that may be arranged with the shielded component 500 consistent with the arranging a shielding material with the capacitor 306.

In particular, the shielded component 500 may be implemented as and/or with one or more passive circuits and/or one or more passive components. In particular, the shielded component 500 may be implemented as one or more capacitors, one or more inductors, one or more resistors, and/or the like. In aspects, the one or more capacitors, one or more inductors, one or more resistors, and/or the like may be connected in series and/or in parallel between the first terminal 101 and the second terminal 102.

In aspects, the shielded component 500 may be implemented as an integrated passive device (IPD) that may be implemented as and/or with one or more passive circuits. In aspects, the shielded component 500 may be implemented as an integrated passive device (IPD). In aspects, the shielded component 500 may be implemented as an integrated passive device (IPD) having one or more capacitors, one or more inductors, one or more resistors, and/or the like. In aspects, the shielded component 500 may be implemented as a surface mount device (SMD) integrated passive device (IPD) having one or more capacitors, one or more inductors, one or more resistors, and/or the like.

In aspects, the shielded component 500 may be implemented as an integrated passive device (IPD) having one or more capacitors, one or more inductors, and/or the like that may include the shielding structure 190 as described herein. In aspects, the shielded component 500 may be a two terminal device and may be implemented as a resonator or implemented as part of a resonator and may include the shielding structure 190 as described herein.

In aspects, the shielded component 500 may be implemented as an integrated passive device (IPD) having one or more capacitors, one or more inductors, one or more resistors, and/or the like. In aspects, the shielded component 500 may be a two terminal device that may be implemented as or part of a resonator, a matching network, harmonic termination circuitry, a pre-matching circuit, a bias-decoupling circuit, and/or the like and may include the shielding structure 190 as described herein.

In aspects, the shielded component 500 may be a resonator having at least one inductance, at least one transmission line, and/or at least one a capacitor. In aspects, the shielded component 500 may be a two terminal device. In aspects, the shielded component 500 may implement the shielding structure 190 with any of the shielding schemes described herein for the shielded capacitor 100.

In particular aspects, arranging the shielding structure 190 with the shielded component 500 may include arranging the shielding structure 190 on or within the dielectric material 150. Further, the shielding structure 190 may be arranged on one surface or more than one surface of the shielded component 500 and/or the dielectric material 150. In particular aspects, the arranging a shielding material with the shielded component 500 may include configuring the first upper capacitor metal 121 as the shielding structure 190 as described herein.

In particular aspects, the arranging a shielding material with the shielded component 500 may include arranging the shielding structure 190 with a metal layer, a sputtered metal layer, a plurality of metal layers, a plurality of sputtered metal layers, and/or the like. In aspects, the shielding structure 190 may be include various metal materials including one or more of aluminum, copper, silver, gold, and/or the like. In one aspect, the shielding structure 190 may be a sputtered metal layer.

In particular aspects, the arranging a shielding material with the shielded component 500 may include sputtering at least one metal layer to form the shielding structure 190 In aspects, the shielding structure 190 may be include various metal materials including one or more of aluminum, copper, silver, gold, and/or the like. In one aspect, the shielding structure 190 may be a sputtered metal layer.

Figure 22:
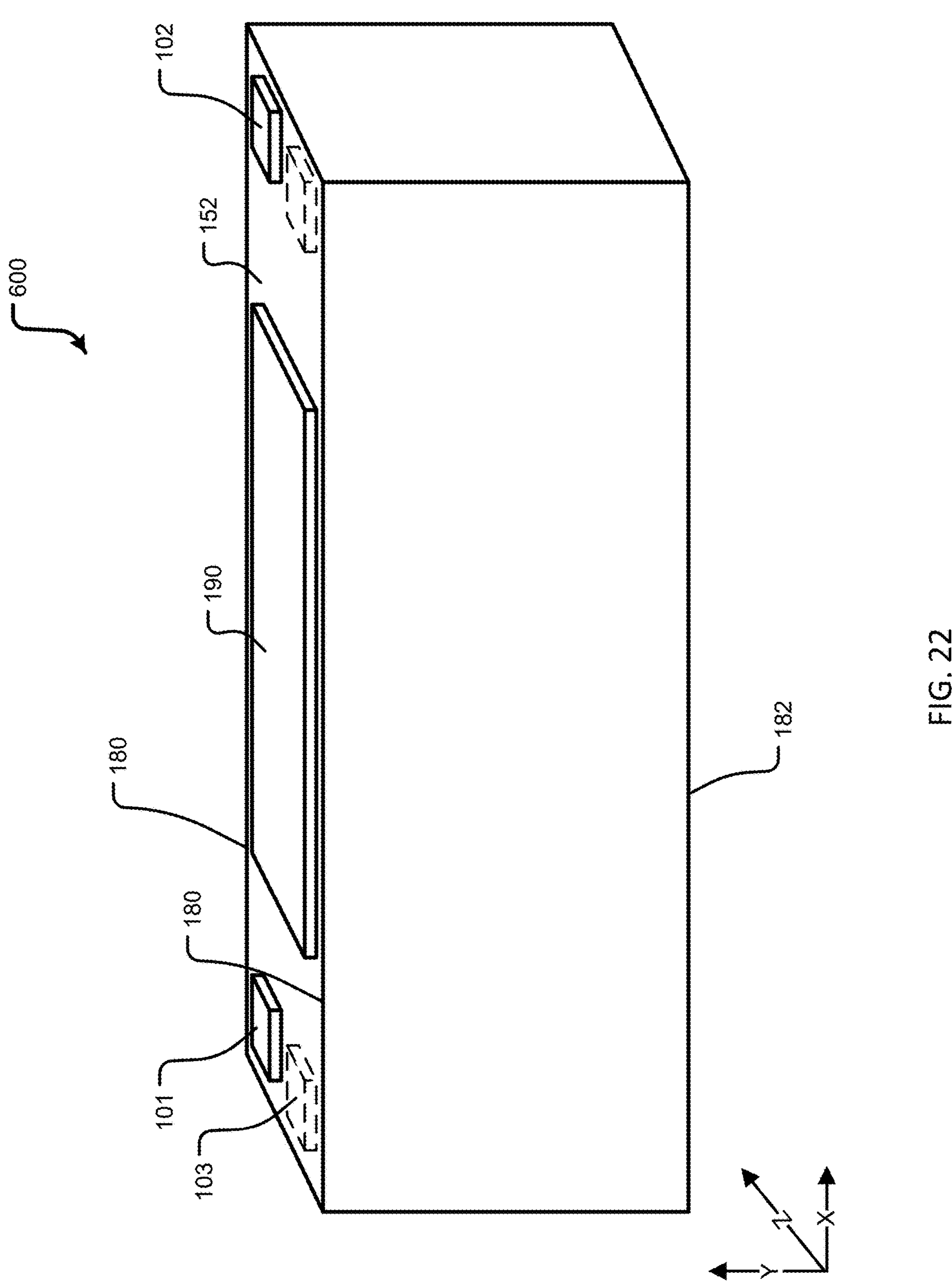
FIG. 22 illustrates a perspective view of a shielded component according to aspects of the disclosure.

FIG. 22 illustrates a perspective view of a shielded component according to aspects of the disclosure.

Figure 23:
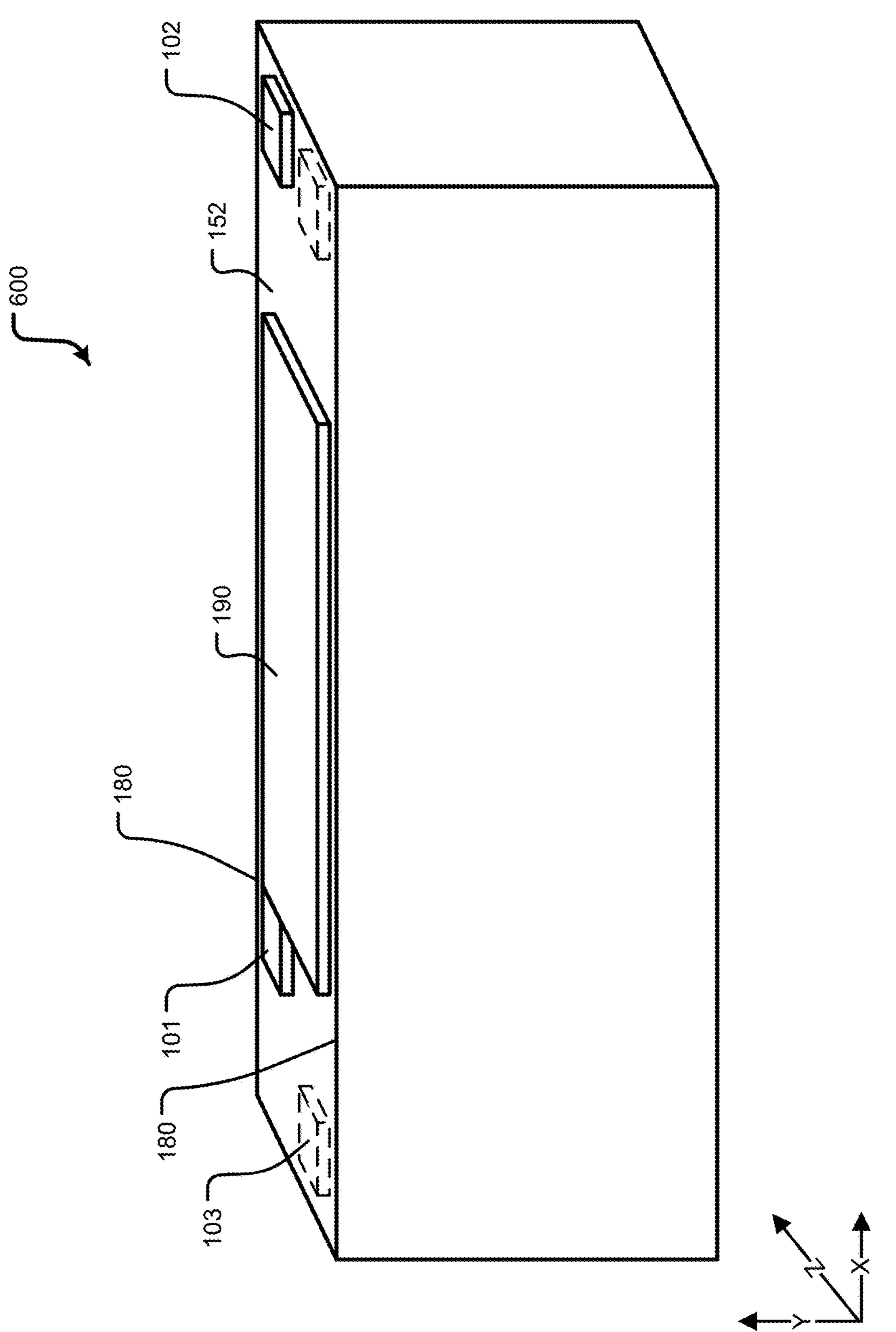
FIG. 23 illustrates a perspective view of another shielded component according to aspects of the disclosure.

FIG. 23 illustrates a perspective view of another shielded component according to aspects of the disclosure.

Figure 24:
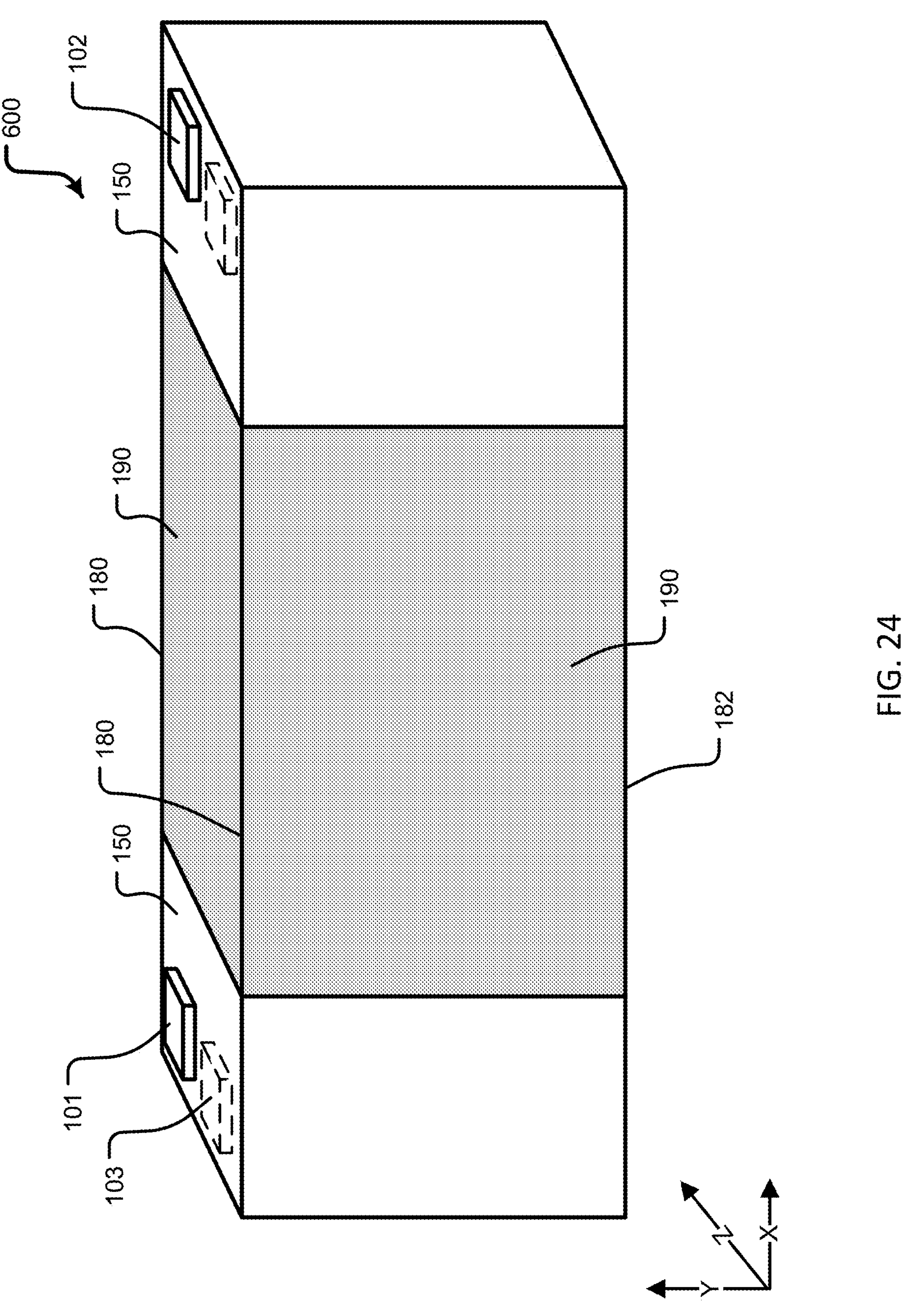
FIG. 24 illustrates a perspective view of another shielded component according to aspects of the disclosure.

FIG. 24 illustrates a perspective view of another shielded component according to aspects of the disclosure.

In particular, FIG. 22, FIG. 23, and FIG. 24 illustrate various implementations of a shielded component 600 according to aspects of the disclosure. In particular, the shielded component 600 may include the first terminal 101 and the second terminal 102 as described herein. Additionally, the shielded component 600 may include other terminals 103. In aspects, there may be any number of the other terminals 103. Further, the first terminal 101, the second terminal 102, and/or the other terminals 103 may form various terminations, inputs, outputs, and/or the like to the shielded component 600. Additionally, the first terminal 101, the second terminal 102, and/or the other terminals 103 may take various forms and shapes. For example, the first terminal 101, the second terminal 102, and/or the other terminals 103 may be arranged on the upper surface 152 of the shielded component 600, the lower edge 182 of the shielded component 600, and/or other locations of the shielded component 600. Further, the shielded component 600 may include the shielding structure 190 as described herein.

In particular, the aspects of the shielded component 600 illustrated in FIG. 22, FIG. 23, and/or FIG. 24 may optionally include any other aspects of the shielded capacitor 100, the shielding structure 190, the device 200, the process of configuring a capacitor with shielding 300, the process of configuring a device with a shielded capacitor 400, and/or the like as described herein.

In aspects, the shielded component 600 may be implemented in the device 200. In aspects, the shielded component 600 may be implemented in the device 200 together with the shielded capacitor 100. In aspects, the shielded component 600 may include the shielding structure 190 that may be arranged with the shielded component 600 consistent with the arrangement of the shielding structure 190 with the shielded capacitor 100. In aspects, the shielded component 600 may include the shielding structure 190 that may be arranged with the shielded component 600 consistent with the process of configuring a capacitor with shielding 300. In aspects, the shielded component 600 may include the shielding structure 190 that may be arranged with the shielded component 600 consistent with the arranging a shielding material with the capacitor 306.

In particular, the shielded component 600 may be implemented as and/or with one or more passive circuits and/or one or more passive components. In particular, the shielded component 600 may be implemented as one or more capacitors, one or more inductors, one or more resistors, and/or the like. In aspects, the one or more capacitors, one or more inductors, one or more resistors, and/or the like may be connected in series and/or in parallel between the first terminal 101 and the second terminal 102.

In aspects, the shielded component 600 may be implemented as an integrated passive device (IPD) that may be implemented as and/or with one or more passive circuits. In aspects, the shielded component 600 may be implemented as an integrated passive device (IPD). In aspects, the shielded component 600 may be implemented as an integrated passive device (IPD) having one or more capacitors, one or more inductors, one or more resistors, and/or the like. In aspects, the shielded component 600 may be implemented as a surface mount device (SMD) integrated passive device (IPD) having one or more capacitors, one or more inductors, one or more resistors, and/or the like.

In aspects, the shielded component 600 may be implemented as an integrated passive device (IPD) having one or more capacitors, one or more inductors, and/or the like that may include the shielding structure 190 as described herein. In aspects, the shielded component 600 may be a multiple terminal device and may be implemented as a resonator or implemented as part of a coupler, a balun, a filter, and/or the like and may include the shielding structure 190 as described herein.

In aspects, the shielded component 600 may be implemented as an integrated passive device (IPD) having one or more capacitors, one or more inductors, one or more resistors, and/or the like. In aspects, the shielded component 600 may be a multiple terminal device that may be implemented as or part of a coupler, a balun, a filter, a resonator, a matching network, harmonic termination circuitry, a pre-matching circuit, a bias-decoupling circuit, and/or the like and may include the shielding structure 190 as described herein.

In aspects, the shielded component 600 may be a resonator having at least one inductance, at least one transmission line, and/or at least one a capacitor. In aspects, the shielded component 600 may be a multiple terminal device. In aspects, the shielded component 600 may implement the shielding structure 190 with any of the shielding schemes described herein for the shielded capacitor 100.

In aspects, the shielded component 600 may include one or more passive circuits with several passives that may be configured as a matching network, a coupler, a balun, a filter, and/or the like. In aspects, the shielded component 600 may implement the shielding structure 190 with sputtered metal on one or several faces of the shielded component 600. In aspects, the shielding structure 190 may be implemented with a sputtered structure that may be connected to a ground termination as illustrated in FIG. 9.

In particular aspects, arranging the shielding structure 190 with the shielded component 600 may include arranging the shielding structure 190 on or within the dielectric material 150. Further, the shielding structure 190 may be arranged on one surface or more than one surface of the shielded component 600 and/or the dielectric material 150. In particular aspects, the arranging a shielding material with the shielded component 600 may include configuring the first upper capacitor metal 121 as the shielding structure 190 as described herein.

In particular aspects, the arranging a shielding material with the shielded component 600 may include arranging the shielding structure 190 with a metal layer, a sputtered metal layer, a plurality of metal layers, a plurality of sputtered metal layers, and/or the like. In aspects, the shielding structure 190 may be include various metal materials including one or more of aluminum, copper, silver, gold, and/or the like. In one aspect, the shielding structure 190 may be a sputtered metal layer.

In particular aspects, the arranging a shielding material with the shielded component 600 may include sputtering at least one metal layer to form the shielding structure 190 In aspects, the shielding structure 190 may be include various metal materials including one or more of aluminum, copper, silver, gold, and/or the like. In one aspect, the shielding structure 190 may be a sputtered metal layer.

Accordingly, the disclosure has set forth devices and processes that may address, solve, alleviate, reduce, and/or the like a detuning problem, such as a change in RF characteristics of an RF device. In particular, a change in RF characteristics as it relates to one or more components, such as capacitors, in closer proximity to one or more metallic structures.

Additionally, the disclosure has set forth a device and/or process configured to be unsensitive to implementation of the one or more metallic structures in conjunction with the one or more components, such as capacitors. In aspects, addressing the detuning problem may result in more predictable components, more predictable operation of components, more predictable devices, more predictable operation of devices, and/or the like.

Further, the disclosure has set forth a device and/or process to address the detuning problem that may result in more predictable components, more predictable operation of components, more predictable devices, more predictable operation of devices, and/or the like with implementations of flip chip configurations having top side cooling devices.

The following are a number of nonlimiting EXAMPLES of aspects of the disclosure.

One EXAMPLE: a shielded capacitor includes a first terminal. The shielded capacitor in addition includes one or more first capacitor metals electrically connected to the first terminal. The shielded capacitor moreover includes a second terminal. The shielded capacitor also includes one or more second capacitor metals electrically connected to the second terminal. The shielded capacitor further includes a shielding structure. The shielded capacitor in addition includes the shielding structure being configured to limit a variation of an RF characteristic due to a presence of a metallic structure.

The above-noted EXAMPLE may further include any one or a combination of more than one of the following EXAMPLES:

The shielded capacitor of the above-noted EXAMPLE where the shielding structure is arranged on a surface of the shielded capacitor adjacent the metallic structure. The shielded capacitor of the above-noted EXAMPLE where the shielding structure includes a metal layer, a sputtered metal layer, a plurality of metal layers, and/or a plurality of sputtered metal layers. The shielded capacitor of the above-noted EXAMPLE where the shielding structure includes a sputtered metal layer. The shielded capacitor of the above-noted EXAMPLE where the shielding structure is arranged within and/or adjacent an upper surface of the shielded capacitor. The shielded capacitor of the above-noted EXAMPLE where the shielding structure is configured to be electrically isolated from the first terminal and/or the second terminal. The shielded capacitor of the above-noted EXAMPLE where the shielding structure is configured to be electrically connected to the first terminal. The shielded capacitor of the above-noted EXAMPLE where the shielding structure includes a first end and a second end. The shielded capacitor of the above-noted EXAMPLE where the first end and the second end are electrically isolated from the first terminal and the second terminal. The shielded capacitor of the above-noted EXAMPLE where the first end is electrically connected to the first terminal. The shielded capacitor of the above-noted EXAMPLE includes a dielectric material located below the shielding structure. The shielded capacitor of the above-noted EXAMPLE where the one or more first capacitor metals includes a first capacitor metal, a first upper capacitor metal, with the dielectric material arranged therebetween; and where the one or more second capacitor metals includes a second lower capacitor metal and a second upper capacitor metal. The shielded capacitor of the above-noted EXAMPLE where the first upper capacitor metal is configured as the shielding structure. The shielded capacitor of the above-noted EXAMPLE where the first capacitor metal and the first upper capacitor metal are arranged vertically above the second upper capacitor metal. The shielded capacitor of the above-noted EXAMPLE where the shielding structure is electrically connected to the first terminal; and where the shielding structure is isolated from the second terminal. The shielded capacitor of the above-noted EXAMPLE where two vertically uppermost implementations of the one or more first capacitor metals are connected to the first terminal. The shielded capacitor of the above-noted EXAMPLE where the shielded capacitor includes a multilayer capacitor, a ceramic capacitor, and/or a multilayer ceramic capacitor. The shielded capacitor of the above-noted EXAMPLE where the shielding structure is arranged on a plurality surfaces of the shielded capacitor including a surface adjacent the metallic structure. The shielded capacitor of the above-noted EXAMPLE where the shielding structure is electrically connected to a substrate. The shielded capacitor of the above-noted EXAMPLE where the shielding structure is arranged on a top surface, a bottom surface, and side surfaces of the shielded capacitor. The shielded capacitor of the above-noted EXAMPLE where the shielded capacitor is configured as a surface mount device (SMD). The device of the above-noted EXAMPLE and includes the metallic structure. The device of the above-noted EXAMPLE where the device includes an RF device, an RF power device, an RF power amplifier, a flip chip RF device, a flip chip RF power device, a flip chip RF power amplifier, a flip chip power amplifier, a low noise amplifier, a filter, and/or a mixer. The device of the above-noted EXAMPLE where the device includes a package and/or a packaged implementation of an RF device, an RF power device, an RF power amplifier, a flip chip RF device, a flip chip RF power device, a flip chip RF power amplifier, a flip chip power amplifier, a low noise amplifier, a filter, and/or a mixer. The device of the above-noted EXAMPLE where the metallic structure includes a cooling device, a topside cooling device, a heat sink, a topside heat sink, a support, a surface, a package support, a package surface, a package support surface, a flange, a metal flange, a leadframe, a metal leadframe, a coin, and/or a copper coin. The device of the above-noted EXAMPLE includes a substrate and the shielded capacitor is mounted to the substrate, where the substrate includes a circuit board, a printed circuit board (PCB), a printed wiring board (PWB), and/or an IPD (integrated passive device) substrate. The device of the above-noted EXAMPLE where the substrate includes a first terminal and a second terminal, where the first terminal of the shielded capacitor is connected to the first terminal of the substrate; and where the second terminal of the shielded capacitor is connected to the second terminal of the substrate. The device of the above-noted EXAMPLE includes support stands configured to support the metallic structure.

One EXAMPLE: a process includes providing a first terminal. The process in addition includes electrically connecting one or more first capacitor metals to the first terminal. The process moreover includes providing a second terminal. The process also includes electrically connecting one or more second capacitor metals to the second terminal. The process further includes providing a shielding structure. The process in addition includes configuring the shielding structure to limit a variation of an RF characteristic due to a presence of a metallic structure.

The above-noted EXAMPLE may further include any one or a combination of more than one of the following EXAMPLES:

The process of the above-noted EXAMPLE includes arranging the shielding structure on a surface of the shielded capacitor adjacent the metallic structure. The process of the above-noted EXAMPLE where the shielding structure includes a metal layer, a sputtered metal layer, a plurality of metal layers, and/or a plurality of sputtered metal layers. The process of the above-noted EXAMPLE includes sputtering a metal layer to form the shielding structure. The process of the above-noted EXAMPLE includes arranging the shielding structure within and/or adjacent an upper surface of the shielded capacitor. The process of the above-noted EXAMPLE where the shielding structure is configured to be electrically isolated from the first terminal and/or the second terminal. The process of the above-noted EXAMPLE where the shielding structure is configured to be electrically connected to the first terminal. The process of the above-noted EXAMPLE where the shielding structure includes a first end and a second end. The process of the above-noted EXAMPLE where the first end and the second end are electrically isolated from the first terminal and the second terminal. The process of the above-noted EXAMPLE where the first end is electrically connected to the first terminal. The process of the above-noted EXAMPLE includes arranging a dielectric material below the shielding structure. The process of the above-noted EXAMPLE where the one or more first capacitor metals includes a first capacitor metal, a first upper capacitor metal, with the dielectric material arranged therebetween; and where the one or more second capacitor metals includes a second lower capacitor metal and a second upper capacitor metal. The process of the above-noted EXAMPLE where the first upper capacitor metal is configured as the shielding structure. The process of the above-noted EXAMPLE where the first capacitor metal and the first upper capacitor metal are arranged vertically above the second upper capacitor metal. The process of the above-noted EXAMPLE where the shielding structure is electrically connected to the first terminal; and where the shielding structure is isolated from the second terminal. The process of the above-noted EXAMPLE where two vertically uppermost implementations of the one or more first capacitor metals are connected to the first terminal. The process of the above-noted EXAMPLE where the shielded capacitor includes a multilayer capacitor, a ceramic capacitor, and/or a multilayer ceramic capacitor. The process of the above-noted EXAMPLE where the shielding structure is arranged on a plurality surfaces of the shielded capacitor including a surface adjacent the metallic structure. The process of the above-noted EXAMPLE where the shielding structure is electrically connected to a substrate. The process of the above-noted EXAMPLE where the shielding structure is arranged on a top surface, a bottom surface, and side surfaces of the shielded capacitor. The process of the above-noted EXAMPLE where the shielded capacitor is configured as a surface mount device (SMD). The process of the above-noted EXAMPLE includes implementing the shielded capacitor and the metallic structure in a device. The process of the above-noted EXAMPLE where the device includes an RF device, an RF power device, an RF power amplifier, a flip chip RF device, a flip chip RF power device, a flip chip RF power amplifier, a flip chip power amplifier, a low noise amplifier, a filter, and/or a mixer. The process of the above-noted EXAMPLE where the device includes a package and/or a packaged implementation of an RF device, an RF power device, an RF power amplifier, a flip chip RF device, a flip chip RF power device, a flip chip RF power amplifier, a flip chip power amplifier, a low noise amplifier, a filter, and/or a mixer. The process of the above-noted EXAMPLE where the metallic structure includes a cooling device, a topside cooling device, a heat sink, a topside heat sink, a support, a surface, a package support, a package surface, a package support surface, a flange, a metal flange, a leadframe, a metal leadframe, a coin, and/or a copper coin. The process of the above-noted EXAMPLE includes providing a substrate and mounting the shielded capacitor to the substrate, where the substrate includes a circuit board, a printed circuit board (PCB), a printed wiring board (PWB), and/or an IPD (integrated passive device) substrate. The process of the above-noted EXAMPLE where the substrate includes a first terminal and a second terminal, where the first terminal of the shielded capacitor is connected to the first terminal of the substrate; and where the second terminal of the shielded capacitor is connected to the second terminal of the substrate. The process of the above-noted EXAMPLE includes configuring support stands to support the metallic structure.

The adhesive of the disclosure may be utilized in an adhesive bonding process that may include applying an intermediate layer to connect surfaces to be connected. The adhesive may be organic or inorganic; and the adhesive may be deposited on one or both surfaces of the surface to be connected. The adhesive may be utilized in an adhesive bonding process that may include applying adhesive material with a particular coating thickness, at a particular bonding temperature, for a particular processing time while in an environment that may include applying a particular tool pressure. In one aspect, the adhesive may be a conductive adhesive, an epoxy-based adhesive, a conductive epoxy-based adhesive, and/or the like.

One EXAMPLE: a shielded component includes a first terminal. The shielded component in addition includes one or more passive devices electrically connected to the first terminal. The component moreover includes a second terminal. The one or more passive devices are further electrically connected to the second terminal. The component further includes a shielding structure. The component in addition includes the shielding structure being configured to limit a variation of an RF characteristic due to a presence of a metallic structure.

The above-noted EXAMPLE may further include any one or a combination of more than one of the following EXAMPLES:

The shielded component of the above-noted EXAMPLE where the shielding structure is arranged on a surface of the shielded component adjacent the metallic structure. The shielded component of the above-noted EXAMPLE where the shielding structure includes a metal layer, a sputtered metal layer, a plurality of metal layers, and/or a plurality of sputtered metal layers. The shielded component of the above-noted EXAMPLE where the shielding structure includes a sputtered metal layer. The shielded component of the above-noted EXAMPLE where the shielding structure is arranged within and/or adjacent an upper surface of the shielded component. The shielded component of the above-noted EXAMPLE where the shielding structure is configured to be electrically isolated from the first terminal and/or the second terminal. The shielded component of the above-noted EXAMPLE where the shielding structure is configured to be electrically connected to the first terminal. The shielded component of the above-noted EXAMPLE where the shielding structure includes a first end and a second end. The shielded component of the above-noted EXAMPLE where the first end and the second end are electrically isolated from the first terminal and the second terminal. The shielded component of the above-noted EXAMPLE where the first end is electrically connected to the first terminal. The shielded component of the above-noted EXAMPLE where the one or more passive devices includes one or more capacitors, one or more inductors, and/or one or more resistors. The shielded component of the above-noted EXAMPLE includes a dielectric material located below the shielding structure. The shielded component of the above-noted EXAMPLE where the shielding structure is electrically connected to the first terminal; and where the shielding structure is isolated from the second terminal. The shielded component of the above-noted EXAMPLE where the shielding structure is arranged on a plurality surfaces of the shielded component including a surface adjacent the metallic structure. The shielded component of the above-noted EXAMPLE where the shielding structure is electrically connected to a substrate. The shielded component of the above-noted EXAMPLE where the shielding structure is arranged on a top surface, a bottom surface, and side surfaces of the shielded component. The shielded component of the above-noted EXAMPLE where the shielded component is configured as a surface mount device (SMD). The device of the above-noted EXAMPLE and includes the metallic structure. The device of the above-noted EXAMPLE where the device includes an RF device, an RF power device, an RF power amplifier, a flip chip RF device, a flip chip RF power device, a flip chip RF power amplifier, a flip chip power amplifier, a low noise amplifier, a filter, and/or a mixer. The device of the above-noted EXAMPLE where the device includes a package and/or a packaged implementation of an RF device, an RF power device, an RF power amplifier, a flip chip RF device, a flip chip RF power device, a flip chip RF power amplifier, a flip chip power amplifier, a low noise amplifier, a filter, and/or a mixer. The device of the above-noted EXAMPLE where the metallic structure includes a cooling device, a topside cooling device, a heat sink, a topside heat sink, a support, a surface, a package support, a package surface, a package support surface, a flange, a metal flange, a leadframe, a metal leadframe, a coin, and/or a copper coin. The device of the above-noted EXAMPLE includes a substrate and the shielded component is mounted to the substrate, where the substrate includes a circuit board, a printed circuit board (PCB), a printed wiring board (PWB), and/or an IPD (integrated passive device) substrate. The device of the above-noted EXAMPLE where the substrate includes a first terminal and a second terminal, where the first terminal of the shielded component is connected to the first terminal of the substrate; and where the second terminal of the shielded component is connected to the second terminal of the substrate. The device of the above-noted EXAMPLE includes support stands configured to support the metallic structure.

One EXAMPLE: a process includes providing a first terminal. The process in addition includes electrically connecting one or more passive devices to the first terminal. The process moreover includes providing a second terminal. The process also includes electrically connecting the one or more passive devices to the second terminal. The process further includes providing a shielding structure. The process in addition includes configuring the shielding structure to limit a variation of an RF characteristic due to a presence of a metallic structure.

The above-noted EXAMPLE may further include any one or a combination of more than one of the following EXAMPLES:

The process of the above-noted EXAMPLE includes arranging the shielding structure on a surface of the shielded component adjacent the metallic structure. The process of the above-noted EXAMPLE where the shielding structure includes a metal layer, a sputtered metal layer, a plurality of metal layers, and/or a plurality of sputtered metal layers. The process of the above-noted EXAMPLE includes sputtering a metal layer to form the shielding structure. The process of the above-noted EXAMPLE includes arranging the shielding structure within and/or adjacent an upper surface of the shielded component. The process of the above-noted EXAMPLE where the shielding structure is configured to be electrically isolated from the first terminal and/or the second terminal. The process of the above-noted EXAMPLE where the shielding structure is configured to be electrically connected to the first terminal. The process of the above-noted EXAMPLE where the shielding structure includes a first end and a second end. The process of the above-noted EXAMPLE where the first end and the second end are electrically isolated from the first terminal and the second terminal. The process of the above-noted EXAMPLE where the first end is electrically connected to the first terminal. The process of the above-noted EXAMPLE includes arranging a dielectric material below the shielding structure. The process of the above-noted EXAMPLE where the one or more passive devices includes one or more capacitors, one or more inductors, and/or one or more resistors. The process of the above-noted EXAMPLE where the shielding structure is electrically connected to the first terminal; and where the shielding structure is isolated from the second terminal. The process of the above-noted EXAMPLE where the shielding structure is arranged on a plurality surfaces of the shielded component including a surface adjacent the metallic structure. The process of the above-noted EXAMPLE where the shielding structure is electrically connected to a substrate. The process of the above-noted EXAMPLE where the shielding structure is arranged on a top surface, a bottom surface, and side surfaces of the shielded component. The process of the above-noted EXAMPLE where the shielded component is configured as a surface mount device (SMD). The process of the above-noted EXAMPLE includes implementing the shielded component and the metallic structure in a device. The process of the above-noted EXAMPLE where the device includes an RF device, an RF power device, an RF power amplifier, a flip chip RF device, a flip chip RF power device, a flip chip RF power amplifier, a flip chip power amplifier, a low noise amplifier, a filter, and/or a mixer. The process of the above-noted EXAMPLE where the device includes a package and/or a packaged implementation of an RF device, an RF power device, an RF power amplifier, a flip chip RF device, a flip chip RF power device, a flip chip RF power amplifier, a flip chip power amplifier, a low noise amplifier, a filter, and/or a mixer. The process of the above-noted EXAMPLE where the metallic structure includes a cooling device, a topside cooling device, a heat sink, a topside heat sink, a support, a surface, a package support, a package surface, a package support surface, a flange, a metal flange, a leadframe, a metal leadframe, a coin, and/or a copper coin. The process of the above-noted EXAMPLE includes providing a substrate and mounting the shielded component to the substrate, where the substrate includes a circuit board, a printed circuit board (PCB), a printed wiring board (PWB), and/or an IPD (integrated passive device) substrate. The process of the above-noted EXAMPLE where the substrate includes a first terminal and a second terminal, where the first terminal of the shielded component is connected to the first terminal of the substrate; and where the second terminal of the shielded component is connected to the second terminal of the substrate. The process of the above-noted EXAMPLE includes configuring support stands to support the metallic structure.

The solder of the disclosure may be utilized to form a solder interface that may include solder and/or be formed from solder. The solder may be any fusible metal alloy that may be used to form a bond between surfaces to be connected. The solder may be a lead-free solder, a lead solder, a eutectic solder, or the like. The lead-free solder may contain tin, copper, silver, bismuth, indium, zinc, antimony, traces of other metals, and/or the like. The lead solder may contain lead, other metals such as tin, silver, and/or the like. The solder may further include flux as needed.

The sintering of the disclosure may utilize a process of compacting and forming a conductive mass of material by heat and/or pressure. The sintering process may operate without melting the material to the point of liquefaction. The sintering process may include sintering of metallic nano or hybrid powders in pastes or epoxies. The sintering process may include sintering in a vacuum. The sintering process may include sintering with the use of a protective gas.

The eutectic bonding of the disclosure may utilize a eutectic soldering process that may form a eutectic system. The eutectic system may be used between surfaces to be connected. The eutectic bonding may utilize metals that may be alloys and/or intermetallics that transition from solid to liquid state, or from liquid to solid state, at a specific composition and temperature. The eutectic alloys may be deposited by sputtering, evaporation, electroplating, and/or the like.

The ultrasonically welding of the disclosure may utilize a process whereby high-frequency ultrasonic acoustic vibrations are locally applied to components being held together under pressure. The ultrasonically welding may create a solid-state weld between surfaces to be connected. In one aspect, the ultrasonically welding may include applying a sonicated force.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto another element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over another element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

The invention claimed is:

1. A shielded capacitor comprising:

a first terminal;

one or more first capacitor metals electrically connected to the first terminal;

a second terminal;

one or more second capacitor metals electrically connected to the second terminal;

a shielding structure;

the shielding structure being configured to limit a variation of an RF characteristic due to a presence of a metallic structure; and a dielectric material located below the shielding structure, wherein the shielding structure extends laterally at least a distance of 50%-80%, between side edges of the shielded capacitor.

2. The shielded capacitor according to claim 1 wherein the shielding structure is arranged on and/or within a surface of the shielded capacitor adjacent the metallic structure.

3. The shielded capacitor according to claim 1 wherein the shielding structure comprises a metal layer, a sputtered metal layer, a plurality of metal layers, and/or a plurality of sputtered metal layers.

4. The shielded capacitor according to claim 1 wherein the shielding structure comprises a sputtered metal layer; and wherein the shielding structure is arranged on and/or within a surface of the shielded capacitor adjacent the metallic structure.

5. The shielded capacitor according to claim 1 wherein the shielding structure is arranged within and/or adjacent an upper surface of the shielded capacitor.

6. The shielded capacitor according to claim 1 wherein the shielding structure is configured to be electrically isolated from the first terminal and/or the second terminal.

7. The shielded capacitor according to claim 1 wherein the shielding structure is configured to be electrically connected to the first terminal; and wherein the shielding structure is arranged on and/or within a surface of the shielded capacitor adjacent the metallic structure.

8. The shielded capacitor according to claim 1 wherein the shielding structure comprises a first end and a second end; and wherein the shielding structure is arranged on and/or within a surface of the shielded capacitor adjacent the metallic structure.

9. The shielded capacitor according to claim 8 wherein the first end is electrically connected to the first terminal.

10. The shielded capacitor according to claim 1 wherein the one or more first capacitor metals comprises a first lower capacitor metal and a first upper capacitor metal, with the dielectric material arranged therebetween; and wherein the one or more second capacitor metals comprises a second lower capacitor metal and a second upper capacitor metal; and wherein the shielding structure is arranged on and/or within a surface of the shielded capacitor adjacent the metallic structure.

11. The shielded capacitor according to claim 1 wherein the shielding structure is electrically connected to the first terminal; wherein the shielding structure is isolated from the second terminal; and wherein the shielding structure is arranged on and/or within a surface of the shielded capacitor adjacent the metallic structure.

12. The shielded capacitor according to claim 10 wherein the first upper capacitor metal is configured as the shielding structure.

13. The shielded capacitor according to claim 10 wherein the first capacitor metal and the first upper capacitor metal are arranged vertically above the second upper capacitor metal.

14. The shielded capacitor according to claim 1 wherein two vertically uppermost implementations of the one or more first capacitor metals are connected to the first terminal.

15. The shielded capacitor according to claim 1 wherein the shielded capacitor comprises a multilayer capacitor, a ceramic capacitor, and/or a multilayer ceramic capacitor.

16. The shielded capacitor according to claim 1 wherein the shielding structure is arranged on a plurality surfaces of the shielded capacitor including a surface adjacent the metallic structure.

17. The shielded capacitor according to claim 16 wherein the shielding structure is electrically connected to a substrate.

18. The shielded capacitor according to claim 1 wherein the shielding structure is arranged on a top surface, a bottom surface, and side surfaces of the shielded capacitor.

19. The shielded capacitor according to claim 1 wherein the shielded capacitor is configured as a surface mount device (SMD).

20. A device comprising the shielded capacitor according to claim 1 and further comprising the metallic structure.

21. The device according to claim 20 wherein the device comprises an RF device, an RF power device, an RF power amplifier, a flip chip RF device, a flip chip RF power device, a flip chip RF power amplifier, a flip chip power amplifier, a low noise amplifier, a filter, and/or a mixer.

22. The device according to claim 20 wherein the device comprises a package and/or a packaged implementation of an RF device, an RF power device, an RF power amplifier, a flip chip RF device, a flip chip RF power device, a flip chip RF power amplifier, a flip chip power amplifier, a low noise amplifier, a filter, and/or a mixer.

23. The device according to claim 20 wherein the metallic structure comprises a cooling device, a topside cooling device, a heat sink, a topside heat sink, a support, a surface, a package support, a package surface, a package support surface, a flange, a metal flange, a leadframe, a metal leadframe, a coin, and/or a copper coin.

24. The device according to claim 20 further comprising a substrate and the shielded capacitor is mounted to the substrate, wherein the substrate comprises a circuit board, a printed circuit board (PCB), a printed wiring board (PWB), and/or an IPD (integrated passive device) substrate.

25. The device according to claim 24 wherein the substrate comprises a first terminal and a second terminal, wherein the first terminal of the shielded capacitor is connected to the first terminal of the substrate; and wherein the second terminal of the shielded capacitor is connected to the second terminal of the substrate.

26. The device according to claim 20 further comprising support stands configured to support the metallic structure.

27. A shielded capacitor comprising:

a first terminal;

one or more first capacitor metals electrically connected to the first terminal;

a second terminal;

one or more second capacitor metals electrically connected to the second terminal;

a shielding structure;

the shielding structure being configured to limit a variation of an RF characteristic due to a presence of a metallic structure, wherein the shielding structure comprises a first end and a second end; and wherein the shielding structure is arranged on and/or within a surface of the shielded capacitor adjacent the metallic structure;

wherein the first end and the second end are electrically isolated from the first terminal and the second terminal; and wherein the shielding structure extends laterally at least a distance of 50%-80%, between side edges of the shielded capacitor.

* * * * *